US012756313B2

(12) United States Patent
Scaduto et al.

(10) Patent No.: US 12,756,313 B2
(45) Date of Patent: Oct. 6, 2026

(54) HALF-BRIDGE DRIVER CIRCUIT, RELATED INTEGRATED CIRCUIT, HALF-BRIDGE CIRCUIT AND METHOD

(71) Applicant: STMicroelectronics International N.V., Geneva (CH)

(72) Inventors: Simone Scaduto, Mussomeli (IT); Simone Manello, Buttigliera d'Asti (IT); Carmelo Alberto Santagati, Catania (IT); Stefano Saggini, Udine (IT)

(73) Assignee: STMicroelectronics International N.V., Geneva (CH)

( * ) Notice: Subject to any disclaimer, the term of this patent is extended or adjusted under 35 U.S.C. 154(b) by 94 days.

(21) Appl. No.: 18/934,710

(22) Filed: Nov. 1, 2024

(65) Prior Publication Data

US 2025/0149983 A1 May 8, 2025

(30) Foreign Application Priority Data

Nov. 3, 2023 (IT) ........................ 102023000023145

(51) Int. Cl.
*H02M 3/158* (2006.01)
*H02M 1/00* (2007.01)
*H02M 3/335* (2006.01)

(52) U.S. Cl.
CPC .......... *H02M 3/158* (2013.01); *H02M 1/0058* (2021.05); *H02M 3/33571* (2021.05)

(58) Field of Classification Search
CPC ............. H02M 1/0009; H02M 1/0025; H02M 3/158; H02M 3/1582
See application file for complete search history.

(56) References Cited

U.S. PATENT DOCUMENTS 10,523,119 B2 * 12/2019 Childs .................. H02M 3/158
2010/0253309 A1 * 10/2010 Xi ........................ H02M 3/156
323/288

(Continued)

FOREIGN PATENT DOCUMENTS

WO 2023118783 A1 6/2023

OTHER PUBLICATIONS

Michal, Vratislav: "Peak-Efficiency Detection and Peak-Efficiency Tracking Algorithm for Switched-Mode DC-DC Power Converters," 2014 IEEE, 14 pgs.

(Continued)

*Primary Examiner* — Ryan Johnson
(74) *Attorney, Agent, or Firm* — Crowe & Dunlevy LLC

(57) ABSTRACT

A half-bridge driver circuit periodically repeats switching cycles by closing a first FET via a first drive signal, detecting an instant when a current flowing through the first FET reaches a threshold and then opening the first FET and closing a second FET via a second drive signal. An error amplifier generates a control voltage by comparing a feedback signal with a reference signal, and a variable current generator generates a first current as a function of the control voltage. The error amplifier includes a proportional-integral controller, and a slope compensation circuit that generates a second current as a ramp signal. The threshold is generated by subtracting the second current from the first current. In response to detecting the instant, the second current is sampled and a signal indicative of the threshold is generated by subtracting the sampled second current from the first current.

12 Claims, 14 Drawing Sheets

(56) References Cited

U.S. PATENT DOCUMENTS

| | | | | |
|---|---|---|---|---|
| 2010/0289473 | A1 | 11/2010 | Ishii et al. | |
| 2018/0083524 | A1* | 3/2018 | Childs ................. | H02M 3/1588 |
| 2019/0013732 | A1 | 1/2019 | Childs et al. | |
| 2021/0384828 | A1* | 12/2021 | Ferrara ............... | H02M 3/1566 |
| 2022/0173657 | A1 | 6/2022 | Ramorini et al. | |

OTHER PUBLICATIONS

IT Search Report and Written Opinion for priority application, IT Appl. No. 102023000023145, report dated May 8, 2024, 8 pgs.

* cited by examiner

HALF-BRIDGE DRIVER CIRCUIT, RELATED INTEGRATED CIRCUIT, HALF-BRIDGE CIRCUIT AND METHOD

PRIORITY CLAIM

This application claims the priority benefit of Italian Application for Patent No. 102023000023145 filed on Nov. 3, 2023, the content of which is hereby incorporated by reference in its entirety to the maximum extent allowable by law.

TECHNICAL FIELD

Embodiments of the present disclosure relate to solutions for driving a half-bridge, e.g., of an electronic converter, such as a buck converter.

BACKGROUND

Power-supply circuits, such as AC/DC or DC/DC switched mode power supplies, are well known in the art. There exist many types of electronic converters, which are mainly divided into isolated and non-isolated converters. For instance, non-isolated electronic converters are the converters of the "buck", "boost", "buck-boost", "Ćuk", "SEPIC", and "ZETA" type. Instead, isolated converters are, for instance, converters of the "flyback", "forward", "half-bridge", and "full-bridge" type. Such types of converters are well known to the person skilled in the art, as evidenced, e.g., by the application note AN513/0393 "Topologies for Switched Mode Power Supplies", L. Wuidart, 1999, STMicroelectronics (incorporated herein by reference).

FIG. 1 is a schematic illustration of a DC/DC electronic converter 20. In particular, a generic electronic converter 20 comprises two input terminals 200*a* and 200*b* for receiving a DC voltage $V_{in}$ and two output terminals 202*a* and 202*b* for supplying a DC voltage $V_{out}$. For example, the input voltage $V_{in}$ may be supplied by a DC voltage source 10, such as a battery, or may be obtained from an AC voltage by means of a rectifier circuit, such as a bridge rectifier, and possibly a filtering circuit. Instead, the output voltage $V_{out}$ may be used to supply a load 30.

For example, FIG. 2 shows the circuit schematic of a buck converter 20. In particular, a buck converter 20 comprises two input terminals 200*a* and 200*b* for receiving a DC input voltage $V_{in}$ and two output terminals 202*a* and 202*b* for supplying a regulated voltage $V_{out}$, where the output voltage is equal to or lower than the input voltage $V_{in}$.

In the example considered, the buck converter 20 comprises two electronic switches Q1 and Q2 (with the current path thereof) connected (e.g., directly) in series between the input terminals 200*a* and 200*b*, wherein the intermediate node between the electronic switches Q1 and Q2 represents a switching node Lx. Specifically, the electronic switch Q1 is a high-side switch connected (e.g., directly) between the (positive) terminal 200*a* and the switching node Lx, and the electronic switch Q2 is a low-side switch connected (e.g., directly) between the switching node Lx and the (negative) terminal 200*b*, which often represents a ground GND. The (high-side) switch Q1 and the (low-side) switch Q2 hence represent a half-bridge configured to connect the switching node Lx to the terminal 200*a* (voltage $V_{in}$) or the terminal 200*b* (ground GND).

The switches Q1 and/or Q2 are often transistors, such as Field-Effect Transistors (FETs), such as Metal-Oxide-Semiconductor Field-Effect Transistors (MOSFETs), e.g., n-channel FET, such as NMOS. Frequently, the second electronic switch Q2 is also implemented just with a diode, where the anode is connected to the terminal 200*b* and the cathode is connected to the switching node Lx.

In the example considered, an inductance L, such as an inductor, is connected (e.g., directly) between the switching node Lx and the (positive) output terminal 202*a*. Instead, the (negative) output terminal 202*b* is connected (e.g., directly) to the (negative) input terminal 200*b*. The converter 20 often comprises a capacitor $C_{out}$ connected (e.g., directly) between the output terminals 202*a* and 202*b* to stabilize the output voltage $V_{out}$.

In this context, FIGS. 3A-3E show exemplary waveforms of the signals of such an electronic converter, where: FIG. 3A shows the signal $DRV_1$ for switching the electronic switch Q1; FIG. 3B shows the signal $DRV_2$ for switching the second electronic switch Q2; FIG. 3C shows the current $I_{Q1}$ that traverses the electronic switch Q1; FIG. 3D shows the voltage $V_{LX}$ at the switching node Lx (i.e., the voltage at the second switch Q2); and FIG. 3E shows the current $I_L$ that traverses the inductor L.

In particular, when the electronic switch Q1 is closed at an instant $t_1$ (ON state), the current $I_L$ in the inductor L increases (substantially) linearly. The electronic switch Q2 is at the same time opened. Instead, when the electronic switch Q1 is opened after an interval $T_{ON1}$ at an instant $t_2$ (OFF state), the electronic switch Q2 is closed, and the current $I_L$ decreases (substantially) linearly. Finally, the switch Q1 is closed again after an interval $T_{OFF1}$. In the example considered, the switch Q2 is hence closed when the switch Q1 is open, and vice versa. The current $I_L$ may thus be used to charge the capacitor C, which supplies the voltage $V_{out}$ at the terminals 202*a* and 202*b*.

In the embodiment considered, the electronic converter 20 comprises thus a control circuit 22 configured to drive the switching of the switch Q1 and of the switch Q2, for repeating the intervals $T_{ON1}$ and $T_{OFF1}$ periodically. For example, typically the buck converter 20 comprises also a feedback circuit (FBC) 24, such as a voltage divider, configured to generate a feedback signal FB indicative of (and preferably proportional to) the output voltage $V_{out}$, and the control circuit 22 is configured to generate the drive signals $DRV_1$ and $DRV_2$ by comparing the feedback signal FB with a reference signal, such as a reference voltage $V_{ref}$.

In general, a buck converter may be operated in a Continuous-Conduction Mode (CCM), Discontinuous-Conduction Mode (DCM) or Transition Mode (TM).

For example, as shown in FIG. 4, when the control circuit 22 operates the converter in CCM, the current $I_L$ flowing through the inductance L has a value different from zero when the switching cycle $T_{SW}$ ends. In this case, the control circuit 22 uses two switching phases $T_1$ and $T_2$, with $T_{SW}=T_1+T_2$, wherein: during the phase $T_1$ ($T_1=T_{ON1}=T_{OFF2}$) the switch Q1 is closed and the switch/diode Q2 is opened; and during the phase $T_2$ ($T_2=T_{OFF1}=T_{ON2}$) the switch Q1 is opened and the switch/diode Q2 is closed.

Conversely, as shown in FIG. 5, when the control circuit 22 operates the converter in DCM, the electronic switch Q2 is opened when the current $I_L$ flowing through the inductance L reaches zero. Accordingly, in this case, the control circuit 22 the control circuit 22 uses indeed three switching phases $T_1$, $T_2$ and $T_3$, with $T_{SW}=T_1+T_2+T_3$, wherein: during the phase $T_1$ ($T_1=T_{ON1}$) the switch Q1 is closed and the switch/diode Q2 is opened; during the phase $T_2$ ($T_2=T_{ON2}$) the switch Q1 is opened and the switch/diode Q2 is closed;

and during the phase $T_3$ ($T_{OFF1}=T_2+T_3$ and $T_{OFF2}=T_3+T_1$) the switch Q1 is opened and the switch/diode Q2 is opened.

A significant number of driving schemes are known for generating the drive signals $DRV_1$ and $DRV_2$. These solutions have in common the possibility of regulating the output voltage $V_{out}$ by regulating the duration of the interval $T_{ON1}$ and/or the interval $T_{OFF1}$. For example, the control circuit 22 often generates a Pulse-Width Modulation (PWM) signal $DRV_1$, wherein the duty-cycle $D=T_{ON1}/(T_{ON1}+T_{OFF1})$ is variable. For example, often the control circuit 22 uses a constant frequency PWM modulation. For example, in this case, the instant $t_1$ may be started periodically after a constant time $T_{SW}$. Conversely, the instant $t_2$ may be determined as a function of the feedback signal FB and the reference signal $V_{ref}$. For example, in this respect, a well-known control method is the Peak-Current Mode (PCM), wherein the control circuit 22 is configured to end the switch-on interval $T_{ON1}$ (instant $t_2$) when the current $I_L$ flowing through the inductance L (or a value indicative of this current) reaches a threshold value $I_{LPK}$, i.e., the maximum value $I_{max}$ of the current $I_L$ corresponds to the threshold value $I_{LPK}$, i.e., $I_{max}=I_{LPK}$, wherein the control circuit 22 comprises a Proportional-Integral (PI) or Proportional-Integral-Derivative (PID) regulator configured to vary the threshold value $I_{LPK}$ in order to regulate the feedback signal FB to the reference signal $V_{ref}$.

Such a peak-current mode is often used also in other half-bridge circuits. For example, FIGS. 6 and 7 show examples of half-bridge circuits 20.

Specifically, the half-bridge circuit 20 comprises a half-bridge including two electronic switches Q1 and Q2 connected in series between the input terminals 200*a* and 200*b*. Moreover, the half-bridge circuit 20 comprises an inductance 28 connected to the intermediate node between the electronic switches Q1 and Q2, i.e., the switching node Lx, wherein the half-bridge is configured to selectively transfer energy from the input voltage $V_{in}$ to the inductance 28. Specifically, the inductance 28 is an inductor L in FIG. 6 and a transformer in FIG. 7. Typically, the inductance 28 is connected between the switching node Lx and ground 200*b*, or the inductance 28 and a capacitor $C_{out}$ are connected in series between the switching node Lx and ground 200*b*. Accordingly, due to the inductive load, the current provided to the inductive load 28 increases (substantially) linearly when the electronic switch Q1 is closed (and the electronic switch Q2 is opened) and decreases (substantially) linearly when the electronic switch Q2 is closed (and the electronic switch Q1 is opened). In this respect, when using a capacitor $C_{out}$, usually the resonant frequency of the resonant tank comprising the inductance 28 and the capacitor $C_{out}$ is large compared to the switching frequency of the electronic switches Q1 and Q2.

For example, with respect to FIG. 6, the inductor L may directly be the load, such as a motor winding. Conversely, in case of a buck converter, the voltage at the capacitor $C_{out}$ is connected to the output terminals 202*a* and 202*b* of the buck converter.

Conversely, as shown in FIG. 7, in a typical half-bridge electronic converter, the inductance 28 comprises a transformer, wherein a primary winding T1 is connected to the switching node Lx (i.e., the primary winding T1 is connected between the switching node Lx and ground 200*b*, or the primary winding T1 and a capacitor C are connected in series between the switching node Lx and ground 200*b*) and the secondary winding T2 is connected, typically via a rectifier circuit 27, to the output terminals 202*a* and 202*b* of the electronic converter. For example, various types of half-bridge converters and respective rectifier circuits are disclosed in U.S. Pat. No. 10,770,980, whose content is incorporated herein by reference. In a typical half-bridge converter, the resonant frequency of the resonant tank (comprising the transformer 28 and possible other reactive components, such as the capacitor C) is usually large compared to the switching frequency of the electronic switches Q1 and Q2.

Also in this case, the half-bridge 20 comprises a control circuit 22 configured to generate the drive signals $DRV_1$ and $DRV_2$ for the electronic switches Q1 and Q2 in order to control the energy transfer from the input voltage $V_{in}$ to the inductance 28. Specifically, when using the peak-current mode, the control circuit 22 receives a signal indicative of the current provided to the inductive load 28 during the switch-on period $T_1$ of the electronic switch Q1, such as a signal CS1 provided by a current sensor 26*a* configured to monitor directly the current $I_L$ provided to the inductive load 28. The current sensor 26*a* may also be replaced with a current sensor 26*b* configured to provide a signal CS2 indicative of (and preferably proportional to) the current $I_{Q1}$ flowing through the switch Q1, which corresponds to the current provided to the inductive load 28 during the interval $T_1$.

Moreover, as described before, the control circuit 22 comprises a PI or PID regulator configured to generate the threshold value for the signal CS1 or CS2 by comparing a feedback signal FB with a reference voltage $V_{ref}$. In general, the feedback signal FB is indicative of (and preferably proportional to) the output quantity to be regulated. For example, in an electronic converter configured as voltage source, the feedback signal FB is indicative of the output voltage $V_{out}$ at the terminals 202*a* and 202*b*. Conversely, in case of a current source, the feedback signal FB is indicative of the output current $i_{out}$ provided via the terminals 202*a* and 202*b*. Conversely, in case of a motor, the feedback signal FB may be indicative of a rotation velocity of the motor.

As described in the foregoing, the control circuit may drive the electronic switches Q1 and Q2 with CCM or DCM. Accordingly, the control circuit 22 may be configured to: periodically start a new switching cycle after a time $T_{SW}$, e.g., in response to a clock signal, by closing the switch Q1 and opening the switch Q2 (instant $t_1$); in response to determining that the current $I_L$ flowing through the inductance 28 (or a value indicative of this current, such as the signal C2) reaches a threshold value $I_{LPK}$, open the switch Q1 and close the switch Q2 (instant $t_2$); and optionally (i.e., when using DCM), in response to determine that the current $I_L$ reaches zero, maintain opened the switch Q1 and open the switch Q2 (instant $t_3$).

Accordingly, when using DCM, the control circuit 22 may also comprise or be connected to a zero-current detection circuit (ZCDC) 26 configured to generate a zero-current signal ZC indicating (at least) the instant $t_3$ when the current provided to the inductance 28 reaches zero, in particular at least during the interval $T_2$. For example, such a zero-current detection circuit 26 may receive the signal CS1 provided by the current sensor 26*a*. Alternatively, the current sensor 26*a* may be replaced with a current sensor 26*c* configured to provide a signal CS3 indicative of (and preferably proportional to) the current $I_{Q2}$ flowing through the switch Q2, which corresponds to the current provided to the inductance 28 during the interval $T_2$. For example, the zero-current signal ZC may be determined via a comparator 26, so called zero current comparator, e.g., configured to determine whether the monitored signal CS1 or CS3 falls below a given threshold (which is usually close to zero). For example, in FIG. 5 is shown an example of the zero-current signal ZC, which is set to high when the measured current is smaller than the threshold (close to zero).

Often, also (usually fixed) dead times may be introduced between the switching of the drive signals, e.g., between the falling edge of the signal $DRV_1$ and the rising edge of the signal $DRV_2$, and similarly (in CCM mode) between the falling edge of the signal $DRV_2$ and the rising edge of the signal $DRV_1$. Insofar as these intervals are usually short compared to the durations $T_{ON1}$ and $T_{OFF1}$, these intervals will not be considered specifically in the following.

The peak value of the current flowing through the (high-side) electronic switch Q1 (which in turn is indicative of the peak value of the current flowing through the inductance 28) may also be useful for other purposes. For example, this value may be useful for determining, e.g., together with other parameters, such as the duty cycle D, the operating condition of the electronic converter 20. For example, based on these values, the control circuit 22 may decide whether to operate the electronic converter in a high-power mode, e.g., using CCM, or a low-power mode, e.g., using DCM with PCM or a burst mode.

Moreover, as described, e.g., in U.S. patent application Ser. No. 18/767,557 (corresponding to Italian Patent Application No. 102023000014532), whose content is incorporated herein by reference, the peak value of the current flowing through an electronic switch may also be used for a so-called power stage partitioning or segmentation, wherein an electronic switch is replaced with a power stage comprising: a plurality of electronic switches, such as FETs, connected in parallel, and/or a FET, wherein the width of the active channel may be controlled selectively, thereby virtually implementing a plurality of electronic switches connected in parallel.

For example, FIG. 8 shows an example wherein a power stage Q, is implemented with a plurality of Field-Effect Transistors (FETs), connected in parallel, such as four FETs S1, S2, S3 and S4. In this case, the drain terminals of the plurality of FETs S1-S4 are connected to a first node/terminal N1 and the source terminals of the plurality of FETs S1-S4 are connected to a second node/terminal N2. Conversely, each of the gate terminals of the plurality of FETs S1-S4 is connected to a respective terminal for receiving a respective drive signal, e.g., drive signals D1, D2, D3 and D4. Generally, also any other number of parallel connected electronic switches with respective drive signals may be used, such as 2, 3, 5, 6, 7, 8 or more electronic switches.

Accordingly, in this case, the control circuit 22 of the half-bridge circuit may be configured to generate the drive signals D1-D4 for the electronic switches S1-S4, in order to select the number of electronic switches, which should be closed contemporaneously. In fact, the primary sources of loss of a FET usually vary with different load currents. For example, at high current, the dominant source of loss is the power converted into heat across the resistance of the FET, i.e., Ohmic losses. At low current, the dominant source derives from switching on and off the FET, i.e., dynamic losses such as switching and driving. For example, the power required to switch on and off the gate of a FET is usually rather constant at any load, but as more current is drawn by the load, the power used to switch the gate becomes a less significant portion of the total power converted. Thus, when splitting the power stage Q into a plurality of (physical and/or virtual) parallel FETs, the effective size of the power switch may be controlled, and the control circuit of the electronic converter may balance: the total switch-on resistance $R_{ds,ON}$, which decreases when increasing the number of closed electronic switches; and the switching losses, which decrease when decreasing the number of closed electronic switches.

For example, the control circuit 22 may be configured to: at high current flows, close more electronic switches S1-S4, thereby reducing the power losses in the switch-on resistance $R_{ds,ON}$, and at low current flows, close less electronic switches S1-S4, thereby reducing the switching losses required to close the electronic switches S1-S4.

For example, in order to decide the number of electronic switches S1-S4, which should be closed, i.e., the partitioning or segmentation of the power stage Q, the control circuit may determine a value indicative of (and preferably proportional to) the peak value of the current flowing through the power stage Q, i.e., the total current flowing through the electronic switches S1-S4. For example, in known solutions, the control circuit is configured to monitor the peak current flowing through the power stage Q and set the number of active FETs using given current thresholds, which may be static or determined as a function of the operating conditions.

In view of the above, there is a need in the art to provide solutions for obtaining the peak value of the current.

SUMMARY

One or more embodiments comprise a half-bridge driver circuit.

Embodiments moreover concern a related integrated circuit, half-bridge circuit and method.

Various embodiments of the present disclosure relate to a half-bridge driver circuit for a half-bridge configured to supply an inductive load. For example, the half-bridge circuit may comprise a first FET and a second FET connected in series between two input terminals configured to receive an input voltage, wherein an intermediate node between the first FET and the second FET represents a switching node configured to supply an inductive load.

Specifically, in various embodiments, the half-bridge driver circuit, e.g., implemented in an integrated circuit, comprises a first terminal configured to provide a first drive signal to the gate terminal of the first FET representing a high-side electronic switch of the half-bridge, and a second terminal configured to provide a second drive signal to the gate terminal of the second FET representing a low-side electronic switch of the half-bridge. The half-bridge driver circuit comprises moreover, a feedback terminal configured to receive a feedback signal indicative of a quantity to be regulated. For example, when the half-bridge circuit is an electronic converter, such as a buck-converter, the feedback signal may be indicative of an output voltage or output current generated by the electronic converter.

In various embodiments, the half-bridge driver circuit is configured to periodically repeat switching cycles by closing the first FET via the first drive signal at the beginning of each switching cycle, detecting an instant when the current flowing through the first FET reaches a threshold value and, in response to detecting the instant, opening the first FET via the first drive signal and closing the second FET via the second drive signal. Moreover, when operating in CCM, the half-bridge driver circuit opens the second FET via the second drive signal at the beginning of each switching cycle. Conversely, when operating in DCM, the half-bridge driver circuit detects a further instant when the current flowing through the second FET reaches zero and, in response to detecting the further instant, opens the second FET via the second drive signal.

In various embodiments, the half-bridge driver circuit comprises a variable current generator configured to generate a first current as a function of a control voltage and an error amplifier configured to generate the control voltage by comparing the feedback signal with a reference signal, wherein the error amplifier comprises a regulator having a proportional and an integral component. In various embodiments, the half-bridge driver circuit comprises also a slope compensation circuit configured to generate a second current, wherein the second current is a ramp signal being reset at the beginning of each switching cycle, and wherein the threshold value is generated by subtracting the second current from the first current. Accordingly, in various embodiments, the half-bridge driver circuit uses the peak-current mode.

For example, in order to detect the instant when the current flowing through the first FET reaches a threshold value, the half-bridge driver circuit may comprise a reference FET configured to be transversed by a third current corresponding to the difference between the first current and the second current, and a comparator configured to generate a signal indicative of the instant by comparing the voltage drop at the reference FET with the voltage drop at the first FET.

In various embodiments, the half-bridge driver circuit is configured to, in response to detecting the instant when the current flowing through the first FET reaches a threshold value, sample the second current at the instant and generate a signal indicative of the threshold value by subtracting the sampled second current from the first current. Accordingly, instead of directly monitoring the peak value of the current flowing through the first FET, various embodiments of the present disclosure generate a signal indicative of the peak value of the current flowing through the first FET by sampling the current provided by the slope compensation circuit, and subtracting the sampled current from the current generated via the variable current generator by the error amplifier.

For example, in various embodiments, the half-bridge driver circuit samples the second current by obtaining a voltage indicative of the second current at the instant and, in response to detecting the instant, storing the obtained voltage to a capacitance. Accordingly, the half-bridge driver circuit may generate a fourth current as a function of the voltage at the capacitance. For example, in various embodiments, the slope compensation circuit comprises a current source configured to generate a ramp signal, and the half-bridge driver circuit comprises a FET configured to be transversed by the ramp signal, wherein a gate terminal of the FET is connected to a drain terminal of the FET. Accordingly, in this case, the voltage indicative of the second current may correspond to a voltage at the gate terminals of the FET. Accordingly, the half-bridge driver circuit may comprise a further FET configured to provide the fourth current, wherein a gate terminal of the further FET is driven via the voltage at the capacitance.

In various embodiments, the variable current generator comprises a current source configured to generate a fifth current proportional to the control voltage, and a current mirror configured to generate the first current by mirroring the fifth current. In this case, the current mirror may also generate a sixth current corresponding to the first current, and the half-bridge driver circuit may generate the signal indicative of the threshold value by subtracting the fourth current, i.e., the sampled current, from the sixth current.

Additionally or alternatively, the half-bridge driver circuit may comprise an operation amplifier, wherein an inverting input of the operation amplifier is connected to the fourth current, a non-inverting input of the operation amplifier is connected to the control voltage and an output terminal of the operation amplifier is connected via a resistance to the inverting input of the operation amplifier, wherein the voltage at the output terminal of the operation amplifier corresponds to the signal indicative of the threshold value.

BRIEF DESCRIPTION OF THE DRAWINGS

Embodiments of the present disclosure will now be described with reference to the annexed drawings, which are provided purely by way of non-limiting example and in which.

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In the following FIGS. 9 to 17, parts, elements or components which have already been described with reference to FIGS. 1 to 8 are denoted by the same references previously used in such Figures; the description of such previously described elements will not be repeated in the following in order not to overburden the present detailed description.

As mentioned before, various embodiments of the present disclosure relate to solutions for obtaining the peak value of the current flowing through the high-side electronic switch of a half-bridge circuit operated in PCM.

Figure 1:
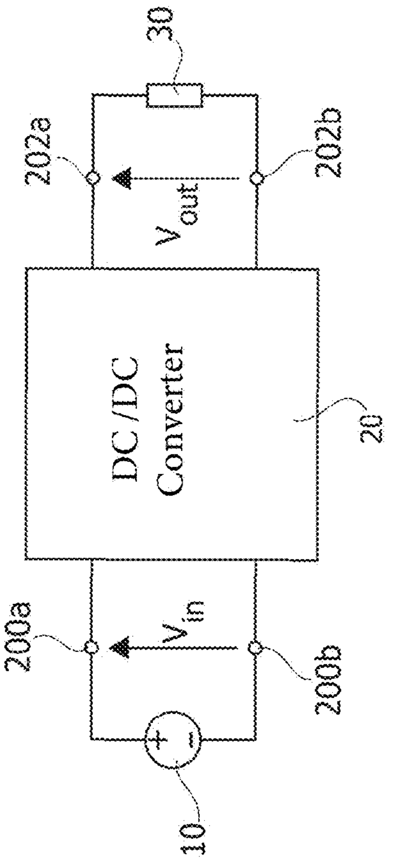
FIG. 1 shows an example of an electronic converter.
Figure 2:
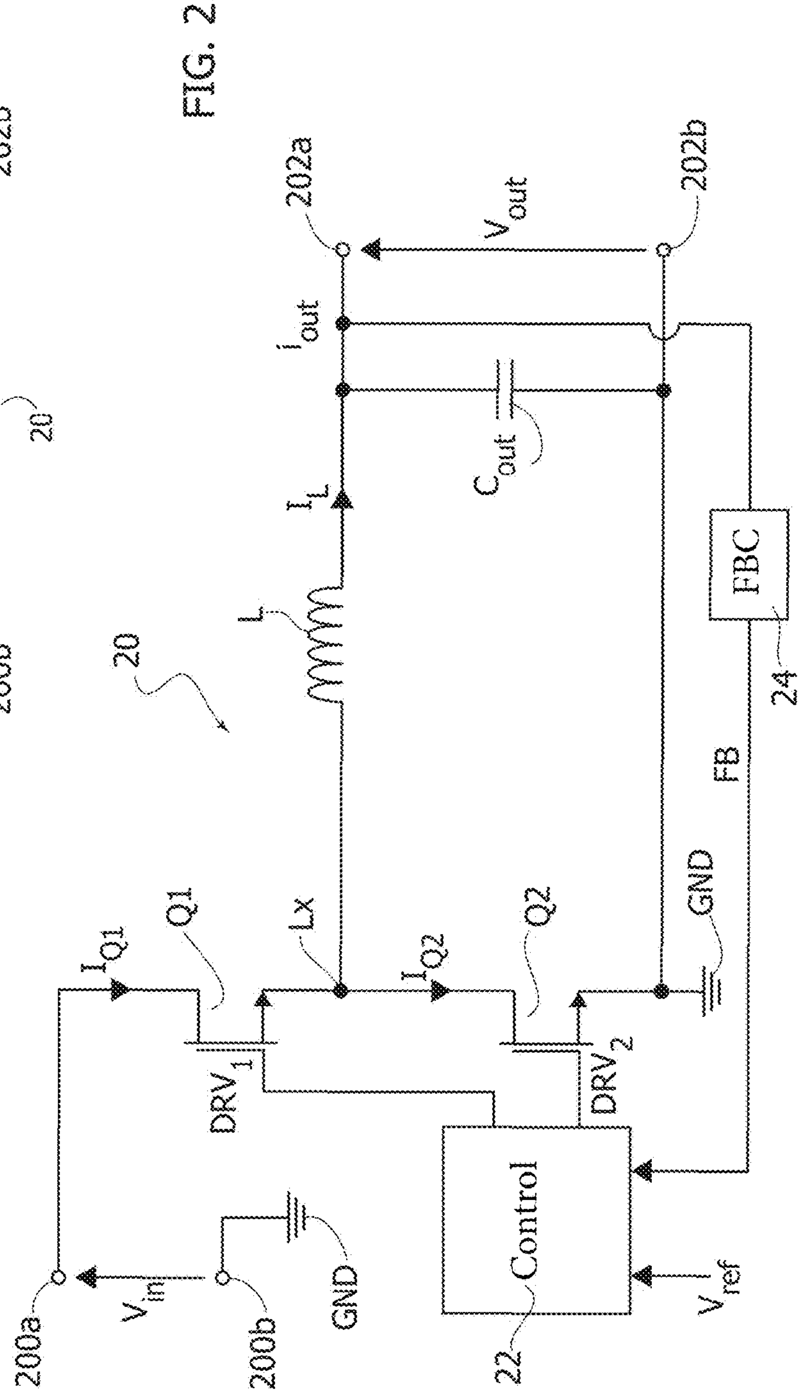
FIG. 2 shows an embodiment of a buck converter.
Figures 3A, 3B, 3C, 3D, 3E:
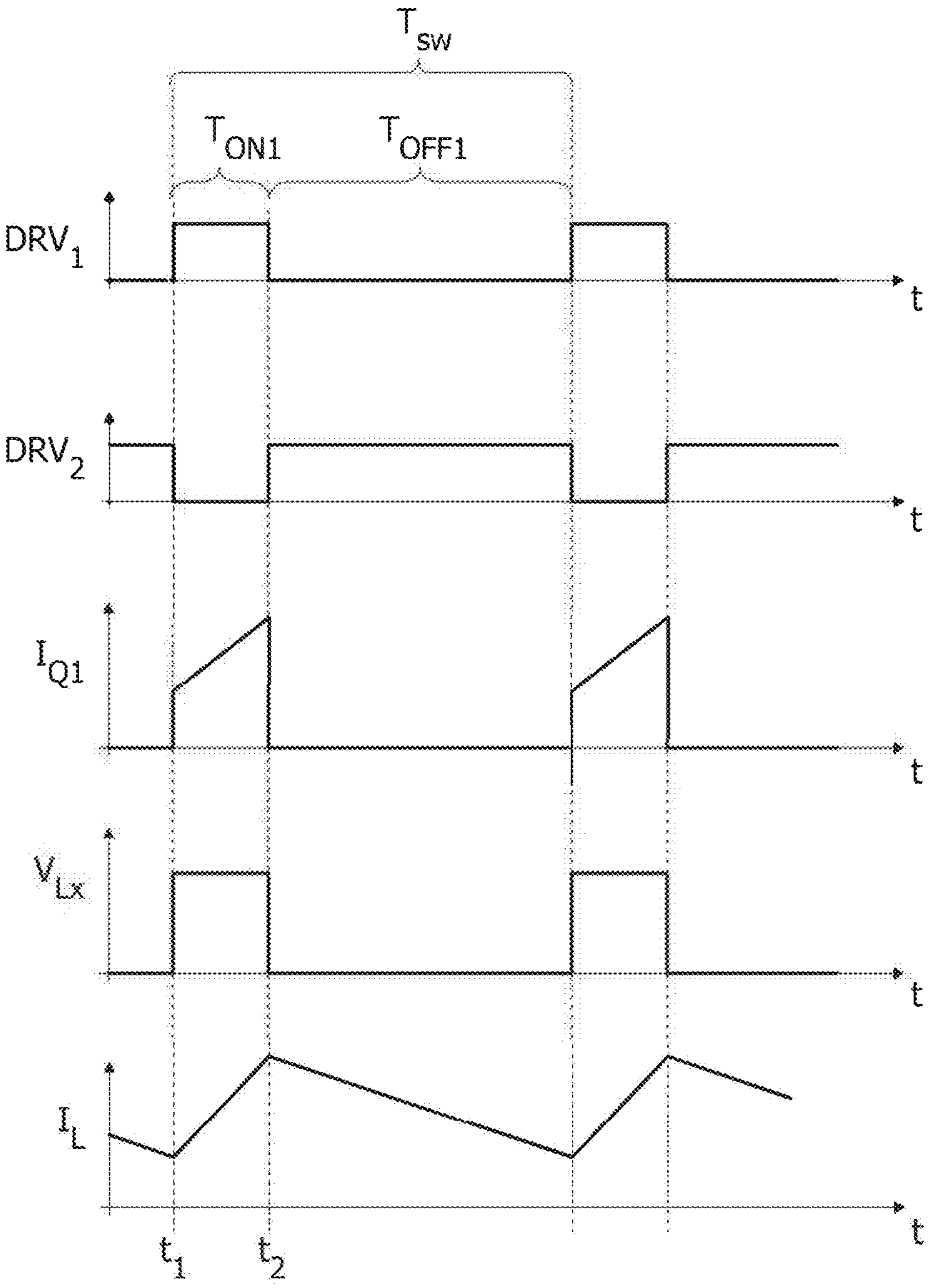
FIGS. 3A-3E show exemplary waveforms of the operation of the electronic converter of FIG. 2.
Figure 4:
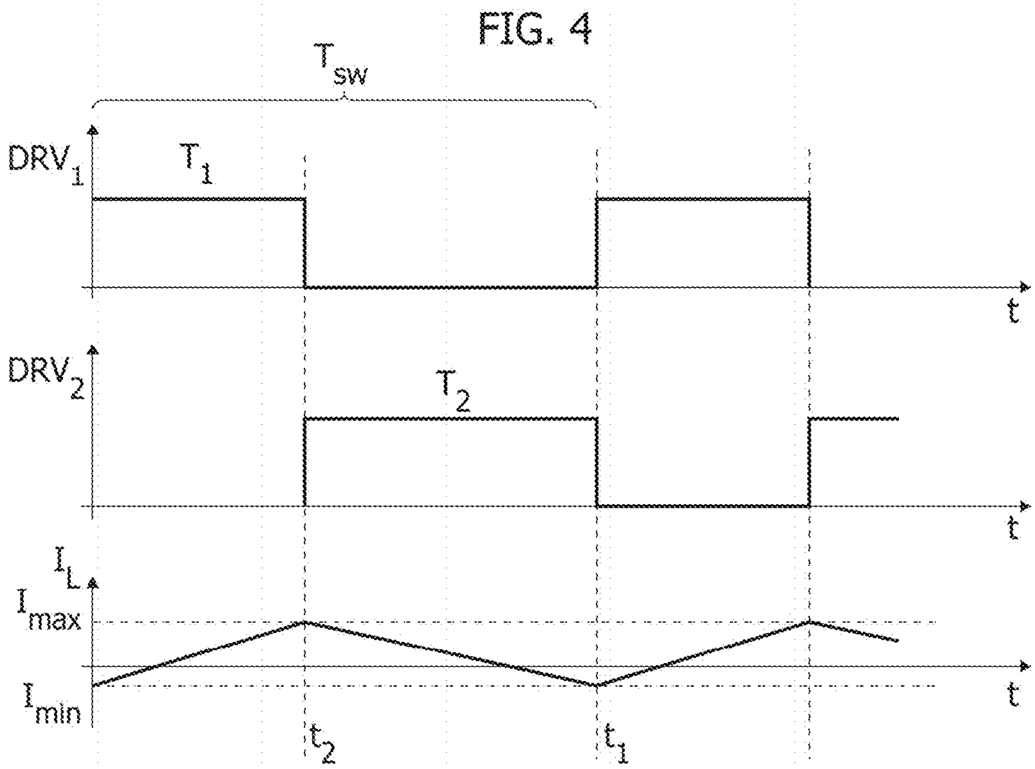
FIG. 4 shows exemplary waveforms when an electronic converter is operated in CCM.
Figure 5:
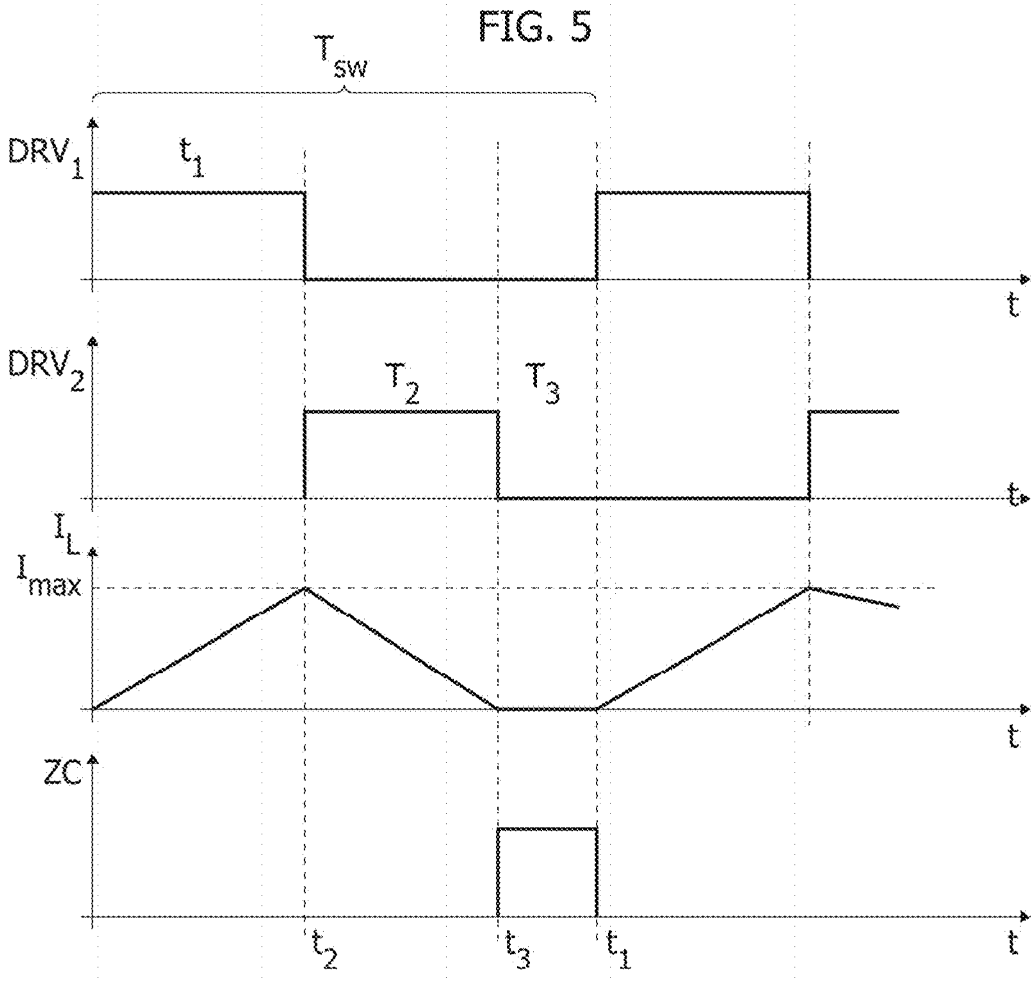
FIG. 5 shows exemplary waveforms when an electronic converter is operated in DCM.
Figure 6:
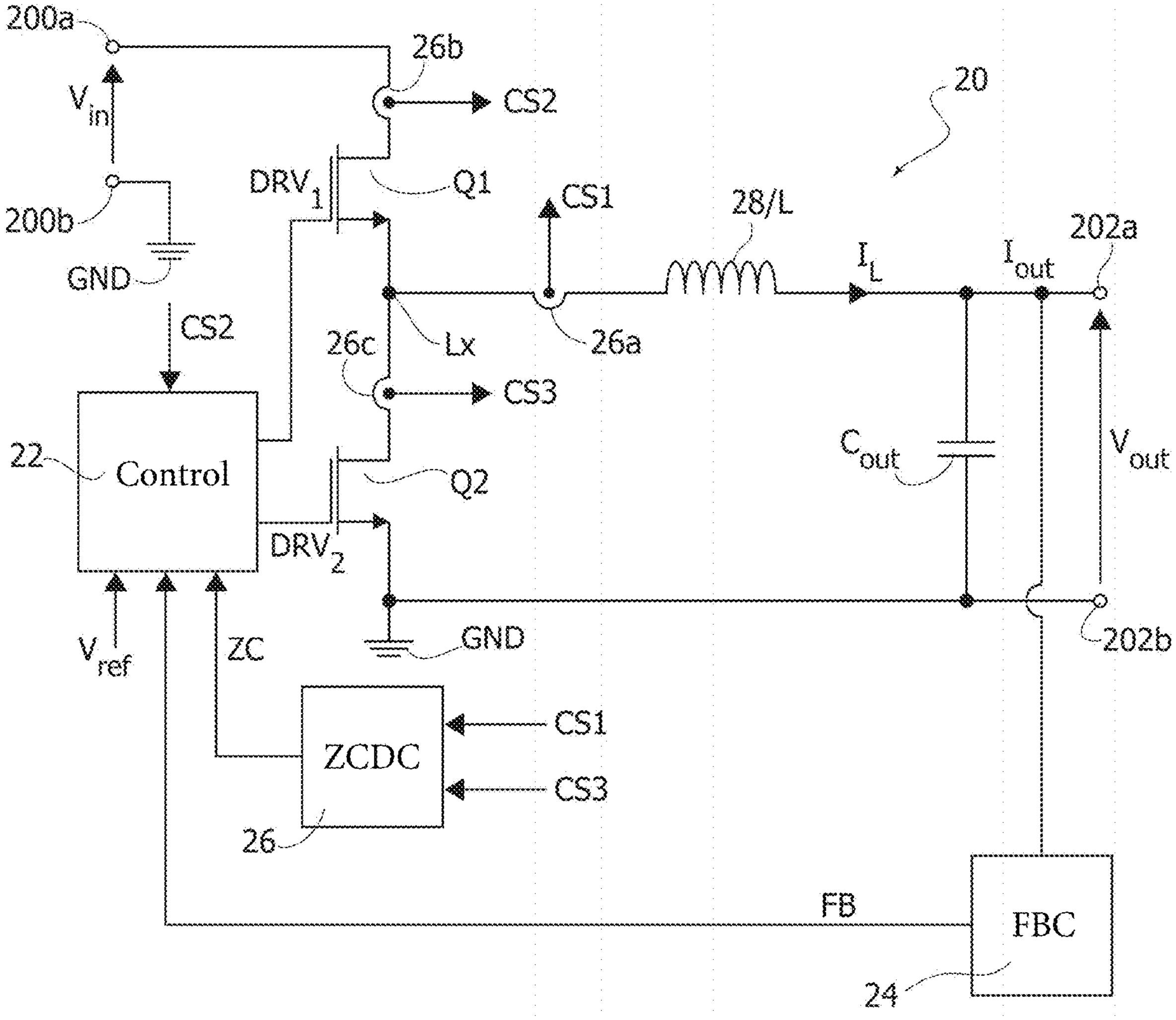
FIG. 6 shows an example of a half-bridge bridge circuit comprising an inductor.
Figure 7:
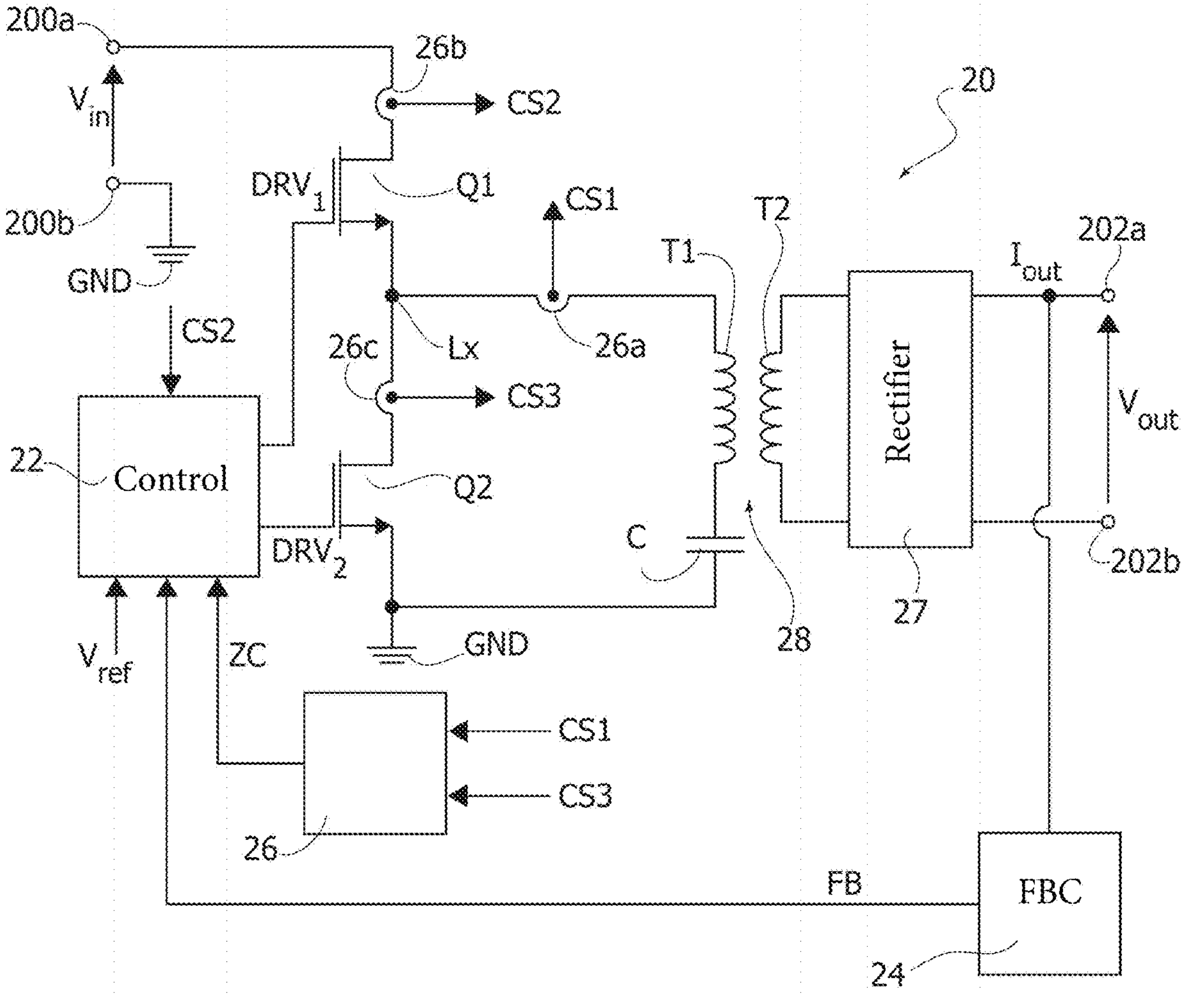
FIG. 7 shows an embodiment of a half-bridge bridge circuit comprising a transformer.
Figure 8:
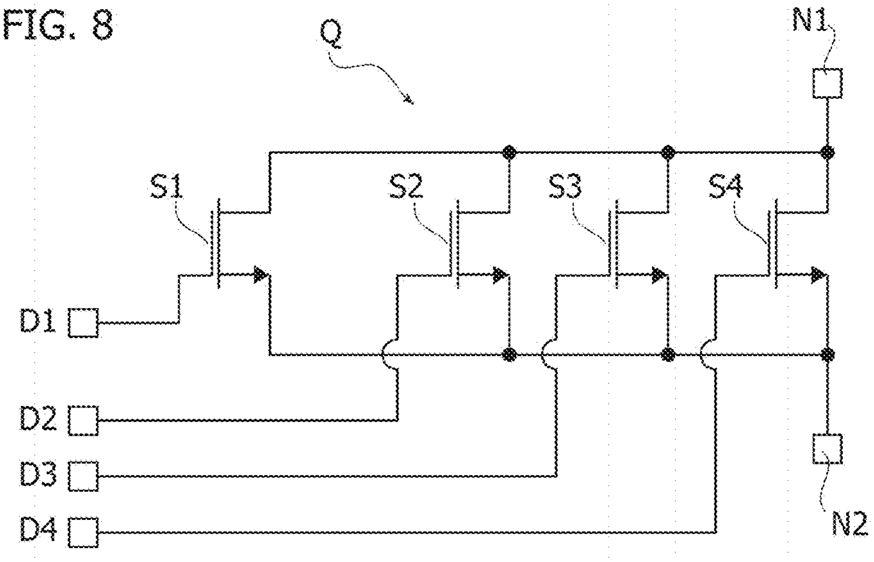
FIG. 8 shows an example of the implementation of a power stage with a plurality of parallel FETs.
Figure 9:
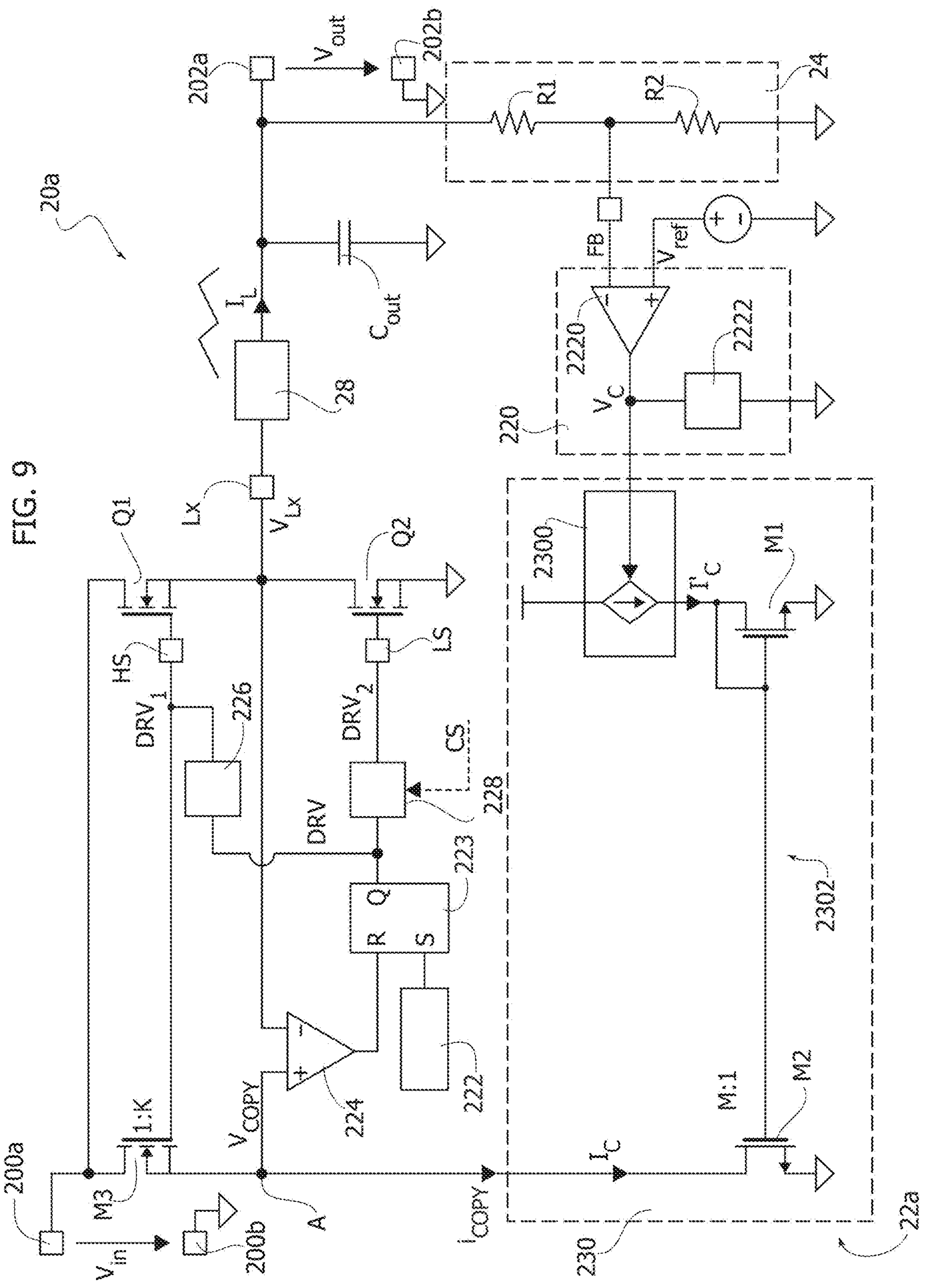
FIG. 9 shows an embodiment of a half-bridge bridge circuit.

FIG. 9 shows an embodiment of a half-bridge circuit 20*a*.

Specifically, in line with the previous description, the half-bridge circuit 20*a* comprises a positive input terminal 200*a* and a negative input terminal 200*b*, e.g., representing a ground, for receiving a DC input voltage $V_{in}$, and two electronic switches Q1 and Q2 connected in series between the positive input terminal 200*a* and the negative input terminal/ground 200*b*. For example, in various embodiments, the electronic switches Q1 and Q2 are n-channel FETs, such as NMOS, wherein the drain terminal of the FET Q1 is connected (e.g., directly) to the positive input terminal 200*a*, the source terminal of the FET Q1 is connected (e.g., directly) to a switching node Lx and the gate terminal of the FET Q1 receives a drive signal $DRV_1$, and wherein the drain terminal of the FET Q2 is connected (e.g., directly) to a switching node Lx, the source terminal of the FET Q1 is connected (e.g., directly) to the negative input terminal/ground 200*b* and the gate terminal of the FET Q1 receives a drive signal $DRV_2$. As described with respect to FIG. 8, each of the n-channel FETs Q1 and Q2 may indeed be implemented with a respective power stage Q comprising a plurality of (physical and/or virtual) parallel connected n-channel FETs.

In the embodiment considered, the half-bridge circuit is configured to supply via the switching node Lx an inductance 28, such as an inductor L or a transformer T. For example, the inductance 28 may be connected between the switching node Lx and the negative input terminal/ground 200*b*, or the inductance 28 and an optional capacitor $C_{out}$ may be connected in series between the switching node Lx and the negative input terminal/ground 200*b*. For possible embodiments of the inductance 28, reference can be made to the previous description, in particular concerning FIGS. 6 and 7. For example, in the embodiment considered, the half-bridge circuit is a buck converter, wherein an inductor L is connected between the switching node Lx and a positive output terminal 202*a* and a capacitor $C_{out}$ is connected between the positive output terminal 202*a* and a negative output terminal 202*b*, which may be connected to the negative input terminal 200*b*. For a general description of such a half-bridge circuit may thus be made reference to the description of FIGS. 1 to 8, which applies in its entirety to the half-bridge circuit 20*a*.

Moreover, the half-bridge circuit 20*a* comprises a half-bridge driver circuit. Specifically, the half-bridge driver circuit comprises a high-side driver (HSD) 226 configured to generate the drive signal $DRV_1$ for the electronic switch Q1, a low-side driver (LSD) 228 configured to generate the drive signal $DRV_2$ for the electronic switch Q2 and a control circuit 22*a* configured to control the operation of the driver circuit 226 and 228 as a function of a feedback signal FB indicative of an output quantity to be regulated. For example, in the embodiment considered, the half-bridge circuit comprises a feedback circuit 24 configured to generate the feedback signal FB. For example, in the embodiment considered, the feedback signal FB is indicative of (and preferably proportional to) the output voltage $V_{out}$ at the output terminals 202*a* and 202*b*. For example, such a feedback circuit 24 may comprise two resistances, such as resistors R1 and R2, connected in series between the terminals 202*a* and 202*b*, wherein the voltage at the resistance R2 corresponds to the feedback signal FB and is thus proportional to the output voltage. However, as described in the foregoing, the feedback signal FB may also be indicative of other output-quantities.

Specifically, in the embodiment considered, the control circuit 22*a* is configured to generate a PWM signal DRV. For example, in various embodiments, the high-side driver circuit 226 is configured to: in response to detecting that the signal DRV changes from de-asserted to asserted, e.g., a rising edge in the signal DRV, set the signal $DRV_1$ (e.g., immediately when using DCM, or after a first dead-time when using CCM) to a first voltage in order to close the electronic switch Q1; and in response to detecting that the signal DRV changes from asserted to de-asserted, e.g., a falling edge in the signal DRV, set the signal $DRV_1$ (e.g., immediately) to a second voltage in order to open the electronic switch Q1.

For example, in various embodiments and as is well-known in the art, based on the value of the input voltage $V_{in}$, the first voltage may correspond to the voltage $V_{in}$ or the control circuit 20*a* may obtain, e.g., receive or generate, a lower supply voltage Vdd, and the driver circuit 226 may comprise or have associated a bootstrap circuit configured to generate, based on the supply voltage Vdd, a supply voltage floating with respect to the voltage $V_{Lx}$ at the switching node Lx. In the former case, the second voltage usually corresponds to ground, i.e., the terminal HS is connected to ground. Conversely, in the latter case, the second voltage may correspond to the voltage $V_{Lx}$ at the switching node Lx, i.e., the terminal HS is connected to the switching node Lx.

In various embodiments, when operating in CCM, the low-side driver circuit 228 is configured to: in response to detecting that the signal DRV changes from asserted to de-asserted, e.g., a falling edge in the signal DRV, set the signal $DRV_2$ (e.g., after a second dead-time) to a third voltage in order to close the electronic switch Q2; and in response to detecting that the signal DRV changes from de-asserted to asserted, e.g., a rising edge in the signal DRV, set the signal $DRV_2$ (e.g., immediately) to a fourth voltage in order to open the electronic switch Q2.

For example, in various embodiments and as is well-known in the art, based on the value of the input voltage $V_{in}$, the third voltage may correspond to the voltage $V_{in}$ or the additional voltage Vdd. Conversely, the fourth voltage usually corresponds to ground, i.e., the terminal LS is connected to ground.

Conversely, when operating in DCM, the low-side driver circuit 228 may also receive a signal CS indicative of the current provided to the inductance 28 when the electronic switch Q2 is closed, such as the signal CS1 or CS3, and the low-side driver circuit 228 may be configured to: in response to detecting that the signal DRV changes from asserted to de-asserted, e.g., a falling edge in the signal DRV, set the signal $DRV_2$ (e.g., after a second dead-time) to the third voltage in order to close the electronic switch Q2; and in response to detecting that the signal CS indicates that the current $I_L$ provided to the inductance 28 reaches zero, set the signal $DRV_2$ (e.g., immediately) to the fourth voltage in order to open the electronic switch Q2.

Accordingly, in the embodiment considered, the half-bridge driver circuit comprises the control circuit 22*a* and the driver circuits 226 and 228. Moreover, the half-bridge driver circuit comprises a first terminal HS configured to provide the signal $DRV_1$ in order to drive the gate terminal of the FET Q1, a second terminal LS configured to provide the signal $DRV_2$ in order to drive the gate terminal of the FET Q2, and a third terminal configured to receive the feedback signal FB from the feedback circuit 24. For example, such a half-bridge driver circuit may be implemented in an integrated circuit, wherein the terminals HS, LS and FB are implemented via respective pads (of an IC die) or pins (of a packaged die). In general, such an IC may also comprise the electronic switches Q1 and Q2, and/or the feedback circuit 24. For example, when comprising the electronic switches, the terminals 200*a*, 200*b*, Lx and FB may be implemented with pads or pins of the IC.

FIG. 9 shows also an embodiment of the control circuit 22*a*. Specifically, in the embodiment considered, the control circuit 22*a* operates again in PCM. Specifically, in the embodiment considered, the control circuit 22*a* is configured to periodically assert (e.g., set to high) the PWM signal DRV after a time $T_{SW}$. For example, in the embodiment considered, the control circuit 22*a* comprises a flip-flop 223, such as a set-reset flip-flop, and an oscillator (OSC) 222. Specifically, the oscillator 222 and the flip-flop 223 are configured to assert the flip-flop 223 periodically after a time $T_{SW}$.

Moreover, the control circuit 22*a* is configured to de-assert (e.g., set to low) the PWM signal DRV in response to determining that the current $I_{Q1}$ flowing through the electronic switch Q1, i.e., the current $I_L$ provided to the inductance 28 during the switch-on period of the electronic switch Q1, reaches a threshold value $I_{LPK}$.

For example, in the embodiment considered, the control circuit 22*a* comprises a voltage comparator 224 configured to compare the voltage drop at the FET Q1, i.e., the difference between the input voltage $V_{in}$ and the voltage $V_{Lx}$ at the switching node Lx, with a threshold voltage indicative of the threshold voltage $I_{LPK}$. Specifically, in order to generate the threshold voltage, the control circuit 22*a* comprises a reference FET M3 corresponding to a scaled version of the FET Q1 according to a given scaling factor K, wherein the drain terminal of the reference FET M3 is connected to the terminal 200*a*, i.e., the drain terminal of the FET Q1, the gate terminal of the reference FET M3 is connected to the drive signal $DRV_1$, i.e., the gate terminal of the FET Q1, wherein a variable current generator 230 is configured to apply a current $I_{COPY}$ to the source terminal of the reference FET M3, indicated in the following also as node A.

Accordingly, the current $I_{COPY}$ generates a voltage drop at the FET M3 corresponding to the difference between the input voltage $V_{in}$ and a voltage $V_{COPY}$ at the source terminal of the FET M3. For example, in various embodiments and as also schematically shown in FIG. 10, the comparator 224 is connected to the voltages $V_{Lx}$ and $V_{COPY}$, wherein the comparator 224 is internally referred to the input voltage $V_{in}$. However also arrangements for measuring and comparing the drain-source voltages at the FETs Q1 and M3 may be used.

Accordingly, in the embodiment considered, the comparator 224 asserts its output when the drain-source voltage of the FET Q1 reaches or exceeds the drain-source voltage of the FET M3, i.e., when:

$$I_{Q1} = I_L = K \cdot I_{COPY} = I_{LPK} \tag{1}$$

Accordingly, by varying the current $I_{COPY}$, the control circuit 22*a* may set the peak value $I_{LPK}$ for the current flowing through the FET Q1, i.e., the current $I_L$ provided via the switching node Lx, during the switch-on period of the FET Q1, i.e., when the signal $DRV_1$ is set to the first voltage in order to close the electronic switch Q1.

As mentioned before, in the embodiment considered, the current $I_{COPY}$ is provided by a variable current generator 230. For example, in the embodiment considered, the variable current generator 230 is configured to generate a current $I_C$ being (approximately) proportional to a control voltage $V_C$ according to a given proportionality coefficient g, i.e., $$I_C = g \cdot V_C \tag{2}$$

wherein the current $I_C$ is applied to the node A, i.e., $I_{COPY}=I_{CM}$.

Accordingly, in various embodiments, in order to implement a PCM, the control circuit 22*a* comprises an error amplifier 220 implemented via a regulator, preferably a PI or PID regulator, configured to vary the voltage $V_C$ until the feedback signal FB corresponds to a reference voltage $V_{ref}$ indicative of a requested value for the output quantity to be regulated, such as a requested value for the output voltage $V_{out}$. For example, in the embodiment considered, the regulator 220 comprises an operational amplifier 2220 receiving at input the feedback signal FB and the reference voltage $V_{ref}$, and a feedback or compensation network (NT) 2222 configured to implement the P, I and optionally D components of the regulator. Specifically, in this case, the control voltage $V_C$ corresponds to the voltage at the output of the operational amplifier 2220.

Accordingly, in the embodiments considered, the variable current generator 230 is configured as a voltage-to-current converter. For example, in the embodiment considered, the current generator 230 comprises a voltage-to-current conversion circuit 2300 configured to generate a current $$I'_C$$

proportional to the voltage $V_C$:

$$I'_C = gm \cdot V_C \tag{3}$$

Moreover, in order to apply the current to the source terminal of the reference FET M3, in various embodiments, the current generator 230 comprises a current mirror 2302 configured to generate a current $I_C$ being proportional to the current $$I'_C$$

according to a given scaling factor M, i.e.:

$$I_C = M \cdot I'_C = M \cdot gm \cdot V_C = g \cdot V_C \quad (4)$$

where g=M·gm corresponds to the proportionality coefficient of the current generator 230.

For example, in the embodiment considered, the current mirror 2302 is implemented with two n-channel FETs M1 and M2, wherein the input stage/the FET M1 is configured to be traversed by the current $$I'_C,$$

wherein the FET M2 is a scaled version of the FET M1 according to the scaling factor M, whereby the output stage/the FET M2 is configured to be traversed by the current $$M \cdot I'_C$$

Specifically, in the embodiment considered, the source terminals of the FETs M1 and M2, are connected to ground, the drain terminal of the FET M1 is connected to the output the voltage-to-current conversion circuit 2300 and received thus the current $$I_C^T,$$

the drain terminal of the FET M2 is connected to the node A, i.e., the source terminal of the reference FET M3, and the gate terminals of the FETs M1 and M2 are connected to the drain terminal of the FET M1.

Figure 10:
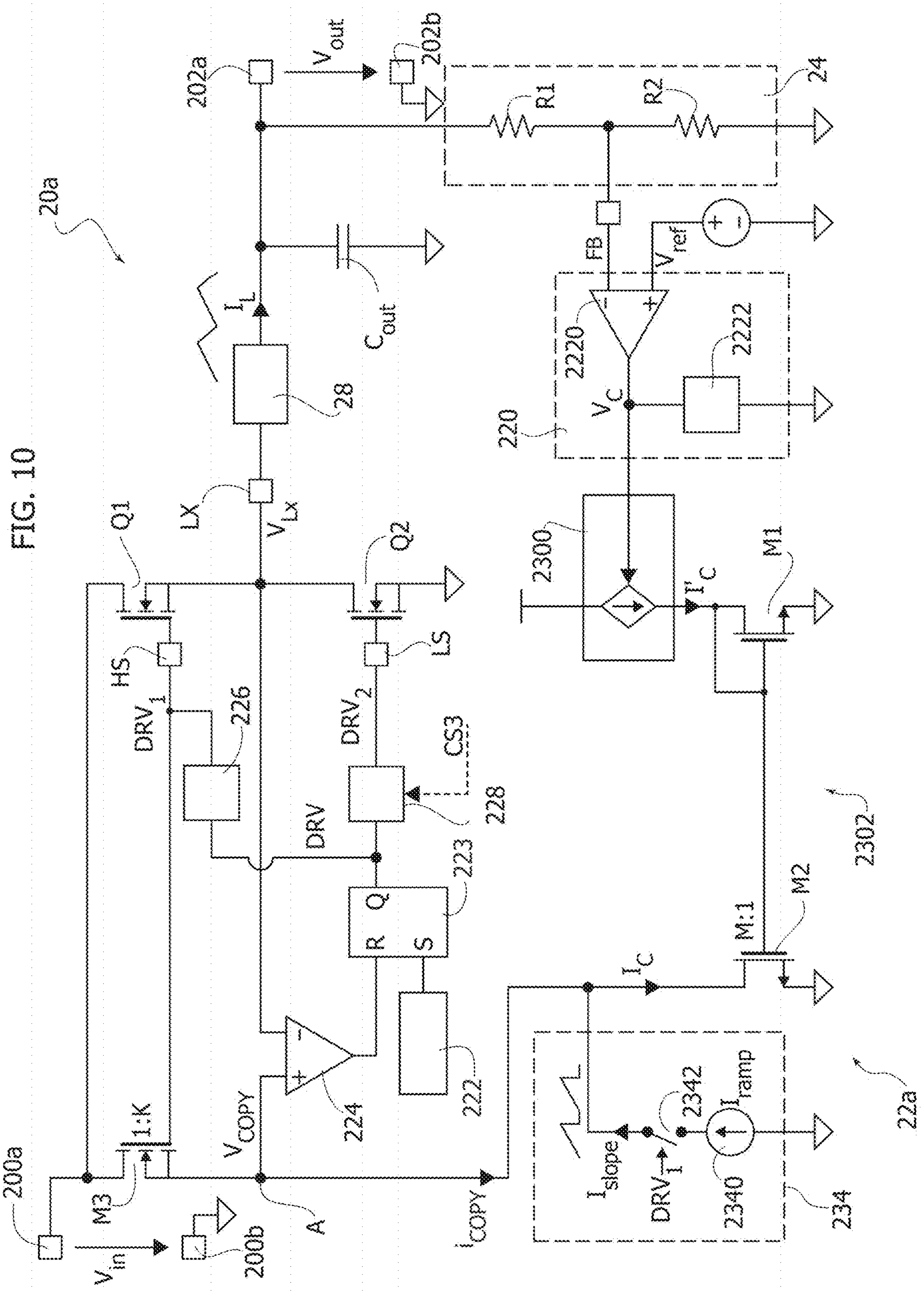
FIG. 10 shows an embodiment of a half-bridge bridge circuit comprising a slope compensation circuit.

Accordingly, in the embodiment shown in FIG. 9, the comparator 224 is configured to de-assert the output of the flip-flop 223 when the current $I_L$ reaches a threshold value corresponding to:

$$I_{LPK} = K \cdot g \cdot V_C \quad (5)$$

whereby the control voltage $V_C$ is proportional to the peak current $I_{LPK}$:

FIG. 10 shows a further embodiment of a half-bridge circuit 20*a*. Specifically, compared to FIG. 9, the current generator 230 has associated a slope compensation circuit (SCC) 234, which is useful to prevent subharmonic oscillations when the duty cycle of the PWM signal $DRV_1$ is above 50%. Specifically, such slope compensation circuits 234 are configured to reduce the current $I_C$ generated by the current generator 230 by a compensation current $I_{slope}$, i.e.:

$$I_{COPY} = I_C - I_{slope} = g \cdot V_C - I_{slope} \quad (6)$$

For example, in the embodiment considered, the slope compensation circuit 234 is connected to the node A, i.e., the output of the current generator 230/the source terminal of the reference FET M3, and is a saw-tooth signal increasing linearly, wherein the saw-tooth signal is reset at the beginning of each switching cycle $T_{SW}$. Specifically, in various embodiments, the current $I_{slope}$ corresponds to: when the FET Q1 is closed, i.e., when the terminal HS is set to the first voltage, to a linearly increasing ramp signal; and when the FET Q1 is opened, i.e., when the terminal HS is set to the second voltage, to zero.

Generally, instead of subtracting an increasing (positive) signal, equation (5) may also be implemented by adding a decreasing (negative) ramp signal.

For example, in the embodiment shown in FIG. 10, the slope compensation circuit 234 comprises a current generator 2340 configured to generate a ramp signal $I_{ramp}$ increasing in each switching cycle $T_{SW}$ from zero to a (positive) peak value of $I_{ramp,PK}$, and an electronic switch 2342 connected between the current generator 2340 and the output of the current generator 230/the source terminal of the reference FET M3, wherein the electronic switch 2342 is arranged to be closed when the electronic switch Q1 is closed and opened when the electronic switch Q1 is opened, e.g., by driving the electronic switch 2342 via the drive signal $DRV_1$. Instead of using the signal $DRV_1$, the electronic switch 2342 may also be driven via the signal DRV.

Also in this case, the FET Q1 is opened when the current $I_{Q1}$ (i.e., $I_L$) reaches a peak value $I_{LPK}$. Specifically, when the FET Q1 is opened at the instant $t_2$, the current $I_{slope}$ has reached a given value corresponding t:

$$I_{slope}(t_2) = D \cdot I_{ramp,PK} \quad (7)$$

where $I_{ramp,PK}$ corresponds to the peak value of the ramp signal $I_{ramp}$, and D is the duty-cycle of the signal $DRV_1$, which approximately corresponds to the duty-cycle of the signal DRV.

Accordingly, in line with equation (5), in the embodiment considered, the peak value for the when the current $I_{Q1}$ (i.e., $I_L$) corresponds to:

$$I_{LPK} = K \cdot (g \cdot V_C - D \cdot I_{ramp,PK}) \quad (8)$$

Figure 11:
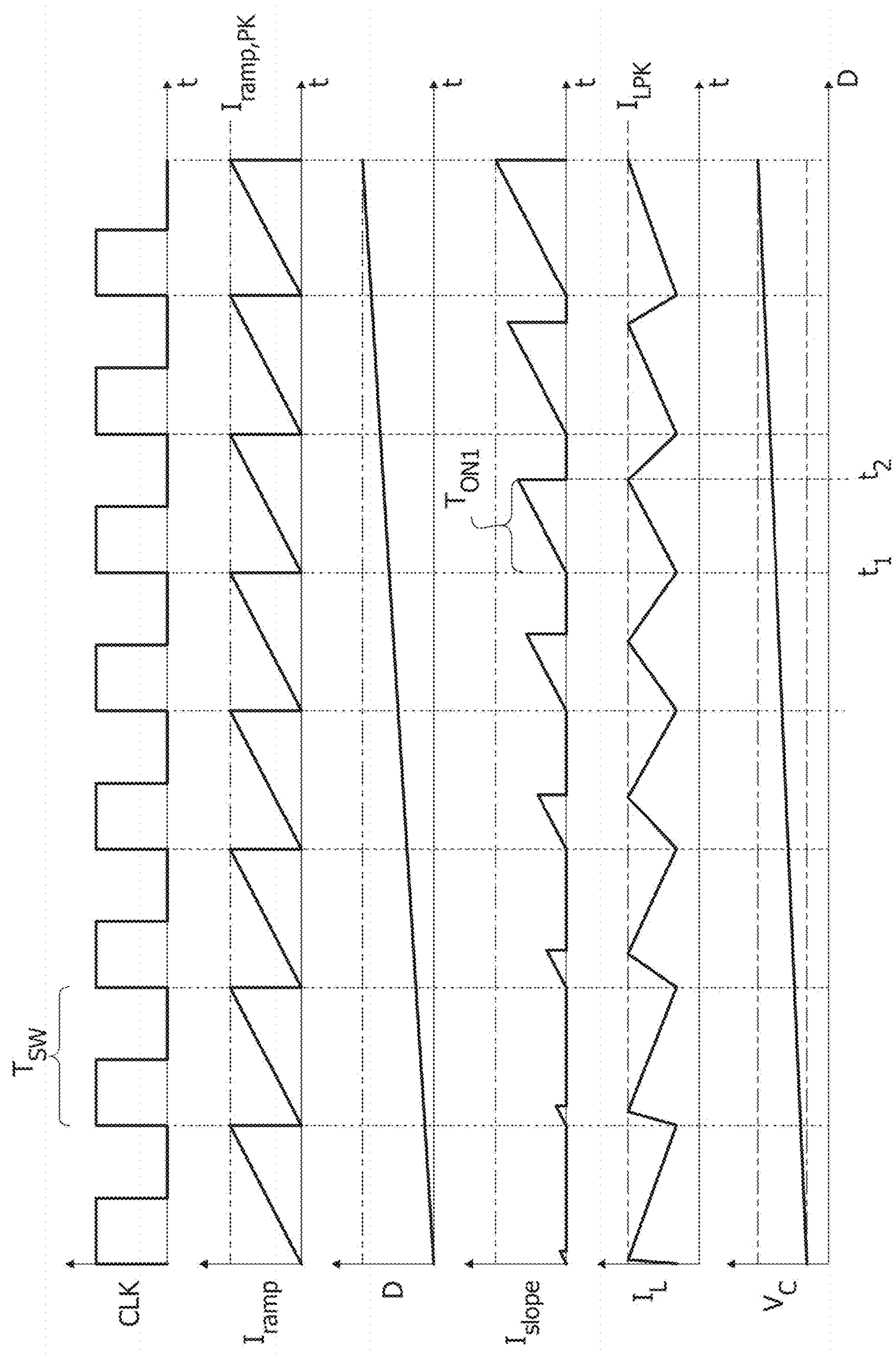
FIG. 11 shows exemplary waveforms of the operation of the half-bridge bridge circuit of FIG. 10.

However, this implies that the control voltage $V_C$ no longer indicates directly the peak current $I_{LPK}$. For example, this is shown in FIG. 11. Specifically, as described in the foregoing, the electronic switch Q1 is closed at an instant $t_1$ at the beginning of each switching cycle $T_{SW}$, e.g., in response to a rising edged in a clock signal CLK. Conversely, the electronic switch Q1 is opened at an instant $t_2$ in response to determining that the current $I_L$ provided via the switching node Lx reaches a given threshold $I_{LPK}$. Specifically, in the shown waveforms, it is assumed that this threshold $I_{LPK}$ remains constant, even though the duty-cycle D increases from 0 to 1. Moreover, in parallel, the slope compensation circuit 234 generates the current $I_{slope}$, which increase from zero to a given peak value $I_{slope}(t_2)$ at the instant $t_2$, which may be determined according to equation (6). Accordingly, as shown in FIG. 11, in order to obtain the same threshold $I_{LPK}$, which includes the contribution of both the current generator 230 and the slope compensation circuit 234, the error amplifier/regulator 220 has to increase the control voltage $V_C$, i.e., the control voltage $V_C$ depends on both the current $I_{LPK}$ and the duty cycle D.

In fact, resolving equation (7) for $V_C$ provides:

$$V_C = (I_{LPK}/K + D \cdot I_{ramp,PK}) \cdot \frac{1}{g} \tag{9}$$

where K and g are constant.

Accordingly, when using a slope compensation for the threshold $I_{LPK}$, the voltage $V_C$ (or the respective current $I_C$) may be used to determine the peak value $I_{LPK}$. For this reason, usually an additional current sensor is used to provide a signal proportional to the current flowing through the electronic switch Q1, such as a shunt resistor connected in series with the electronic switch Q1. However, such additional current sensors, in particular the respective sensing circuit, is usually complex and thus large.

In the following will thus be described an embodiment of a control circuit, which may provide a signal indicative of the peak value $I_{LPK}$ of the current $I_L$ provided via the switching node Lx, which just requires just an additional small circuit.

Specifically, in order to obtain a value being proportional to the peak value $I_{LPK}$, the control circuit could sample the signal $I_{COPY}$ at the instant $t_2$. However, it will be noted that measuring directly the current $I_{COPY}$ would require a large area, e.g., in order to implement an additional copy FET adapted to support the voltage $V_{in}$. Moreover, the current consumption would be high, leading to a reduced in efficiency.

Conversely, in various embodiments, the control circuit 22*a* is configured to sample the current $I_{slope}$ at the instant $t_2$ and then either remove this current from the current $I_C$ or, after a current-to-voltage conversion, from the control voltage $V_C$. Accordingly, the solutions disclosed herein permit that the additional operations are performed in a low-voltage domain, e.g., additional FETs may be small.

Figure 12:
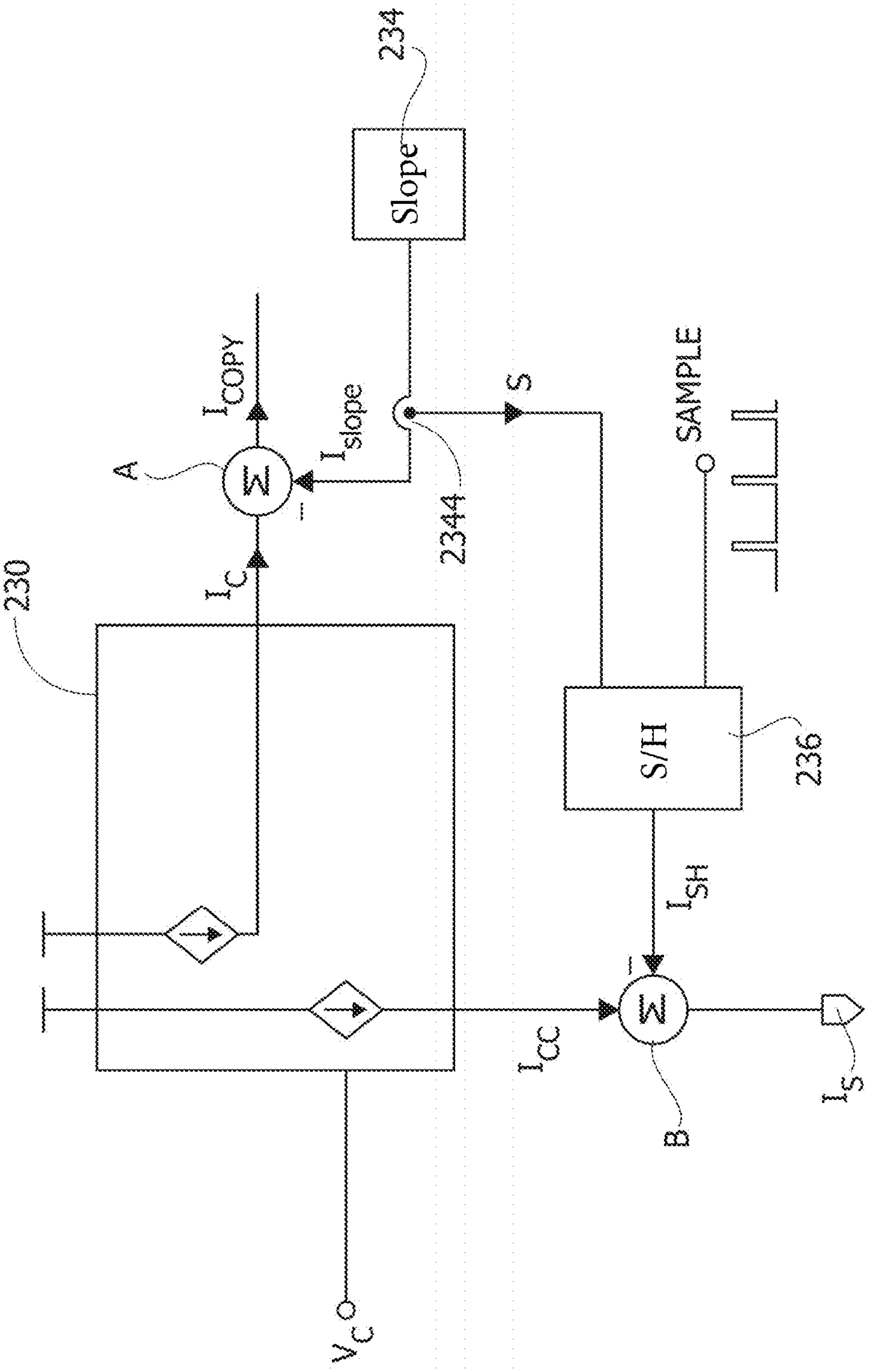
FIG. 12 shows an embodiment of a measurement circuit.

FIG. 12 shows an embodiment of such circuitry. Specifically, in the embodiment considered, the current source 230 is again configured to generate a current $I_C$ proportional to the control voltage $V_C$, i.e., $I_C = g \cdot V_C$. Moreover, the slope compensation circuit generates again a current $I_{slope}$, wherein these currents are used to generate the current $I_{COPY}$ flowing through the reference FET M3, i.e., $I_{COPY} = I_C - I_{slope}$. For example, this is schematically shown via a subtraction node A. However, as mentioned before, when using currents, it is sufficient that these currents (with the correct polarity) are provided to the node A, whereby the resulting current $I_{COPY}$ flows through the reference FET M3.

In the embodiment considered, the current source 230 is configured to generate also a second current $I_{CC}$ corresponding to a copy of the current $I_C$, i.e., $I_{CC} = I_C = g \cdot V_C$. For example, as will be described in the following, when using a current mirror 2302, it is sufficient that this current mirror comprises a further branch.

In the embodiment considered, the slope compensation circuit (SLOPE) 234 is configured to provide a further signal S having a (voltage or current) value being indicative of (and preferably proportional to) the current $I_{slope}$. For example, in FIG. 12 is shown schematically a current sensor 2344 configured to generate the signal S by monitoring the current $I_{slope}$. However, the slope compensation circuit 234 may also directly provide the current $I_{slope}$ and a current signal S having the same value as the current $I_{slope}$. Specifically, the signal S is provided to a sample-and-hold (S/H) circuit 236 configured to generate a current $I_{SH}$ by sampling the signal S at the instant $t_2$, i.e., when the current $I_{Q1}$ ($I_L$) reaches the threshold $I_{LPK}$, wherein the signal $I_{SH}$ correspond to $I_{slope}(t_2)$:

$$I_{SH} = I_{slope}(t_2) = D \cdot I_{ramp,PK} \tag{10}$$

For example, in the embodiment considered, the sample-and-hold circuit 236 is configured to sample the signal S in response to a sample signal SAMPLE. Accordingly, in various embodiments, the signal SAMPLE may comprise a trigger/pulse indicating the instant $t_2$. For example, the control circuit 22*a* may be configured to generate the signal SAMPLE by generating a pulse in the signal SAMPLE in response to detecting a rising edge in the comparison signal at the output of the comparator 224, or a falling edge in the signal DRV.

Equation (10) also highlights that the signal S may be proportional to the ramp current $I_{ramp}$, because the current $I_{slope}$ is essentially identical to the ramp current $I_{ramp}$ while the electronic switch Q1 is closed, i.e., until the instant $t_2$, i.e.:

$$I_{SH} = I_{slope}(t_2) = I_{ramp}(t_2) \tag{11}$$

In the embodiment considered, the control circuit 22*a* is thus configured to generate a current $I_S$ being proportional to the peak value $I_{LPK}$ of the current $I_L$ by subtracting the sampled current $I_{SH}$ from the current $I_{CC}$, i.e.:

$$I_S = I_{CC} - I_{SH} = I_C - D \cdot I_{ramp,PK} \tag{12}$$

which may be resolve according to equations (2) and (9):

$$I_S = (I_{LPK}/K + D \cdot I_{ramp,PK}) - D \cdot I_{ramp,PK} = I_{LPK}/K \tag{13}$$

Figure 13:
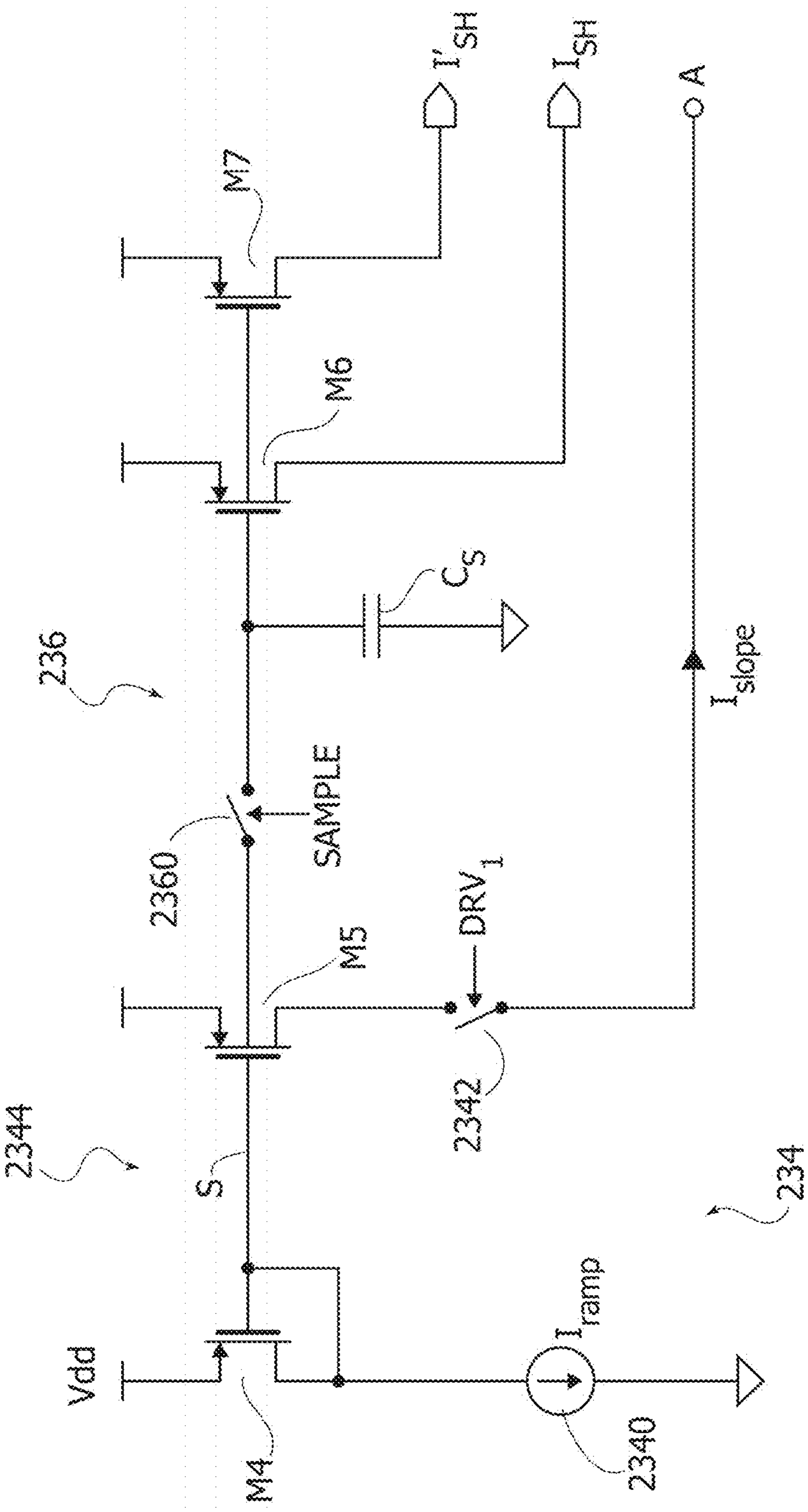
FIG. 13 shows a first embodiment of a sample-and-hold circuit for the measurement circuit of FIG. 12.

FIG. 13 shows a first embodiment of the blocks 234, 2344 and 236. Specifically, in the embodiment considered, the slope compensation circuit comprises again the ramp generator 2340 and the electronic switch 2342. However, instead of providing the current $I_{ramp}$ directly to the node A via the electronic switch 2342, the slope compensation circuit 234 comprises a current mirror comprising two FETs M4 and M5. For example, in the embodiment considered, the FETs M4 and M5 are p-channel FETs, wherein the source terminals of the FETs are connected to a supply voltage, such as Vdd, the drain terminal of the FET M4 is connected to the output of the current source 2340, i.e., the input stage M4 of the current mirror is transversed by the current $I_{ramp}$, the drain terminal of the FET M5 is connected via the electronic switch 2342 to the node A, thereby providing the current $I_{ramp}$ to the node A when the electronic switch 2342 is closed via the signal $DRV_1$ (or DRV), i.e., the output stage M5 of the current mirror and the electronic switch 2342 provide the current $I_{slope}$ to the node A, and the gate terminals of the FETs M4 and M5 are connected to the drain terminal of the FET M4. In various embodiments, the FET M5 may also be a scaled version of the FET M4. However, this embodiment will not be considered specifically in the following, because it results in a scaling of the ramp current $I_{ramp}$ with respect to the current $I_{slope}$.

Accordingly, when using a current mirror M4/M5 for generating a copy of the current $I_{ramp}$, the signal S could be generated via an additional branch of the current mirror M4/M5, thereby supplying a copy of the current $I_{ramp}$. However, it is considered here that, instead of storing a current, it is easier to store a voltage and the gate voltage of the FET M5 (and similarly M4) is already indicative of the current $I_{ramp}$. Accordingly, in various embodiments, the signal S corresponds to the voltage at the gate terminal of the FET M5, i.e., the sample-and-hold circuit 236 is configured to store the voltage at the gate terminal of the FET M5 (i.e., the gate voltage of the FET M4) to a capacitance $C_S$, such as a capacitor, in response to the signal SAMPLE. For example, in the embodiment considered, a first terminal of the capacitance $C_S$ is connected via an electronic switch 2360 to the gate terminal of the FET M5, and a second terminal of the capacitance $C_S$ is connected to a reference voltage, such as ground or Vdd. Accordingly, when the signal SAMPLE is asserted at the instant $t_2$, the electronic switch 2360 is closed, and the capacitance $C_S$ stores a value indicative of the current $I_{slope}(t_2)$. Moreover, once the signal SAMPLE is de-asserted (after a brief time), the capacitance $C_S$ maintains its voltage.

Accordingly, in the embodiment considered, the sample-and-hold circuit 236 may comprise a voltage-to-current conversion circuit configured to convert the voltage stored to the capacitance $C_S$ into the current $i_{SH}$. For example, in the embodiment considered, the first terminal of the capacitance $C_S$ is also connected to the gate terminal of a further FET M6 having the same scaling as the FET M5, whereby the FET M6 provides the sampled current $I_{SH}=I_{slope}(t_2)$. For example, in the embodiment considered, the FET M6 is a p-channel FET, wherein the source terminal of the FET M6 is connected to the source terminal of the FET M5 and the drain terminal of the FET M6 provides the current $I_{SH}$.

Accordingly, in the embodiment considered, the current sensor 2344 is also implemented with the current mirror M4/M5, wherein the signal S corresponds to the voltage at the gate terminal of the FET M5, and the sample-and-hold circuit 236 is configured to store (e.g., in the capacitance $C_S$ and via the electronic switch 2360) the gate voltage of the FET M5 in response to the signal SAMPLE. Moreover, the sample-and-hold circuit 236 comprises a voltage-to-current converter M6 configured to generate the current $I_{SH}$ based on the stored gate voltage.

The solution shown in FIG. 13 has also the advantage that it is sufficient to add one or more further FETs, having the respective gate terminal connected to the first terminal of the capacitance $C_S$ in order to provide further signals corresponding to the current $I_{slope}(t_2)$. For example, as will described in the foregoing, an additional current $$I'_{SH}$$

may be generated by a further FET M7, wherein the current $$I'_{SH}$$

is provided to an overcurrent protection circuit.

In various embodiments, the first terminal of the capacitance $C_S$ may be connected to the gate terminal of the FET M6 via a voltage follower (not shown in FIG. 13).

Figure 14:
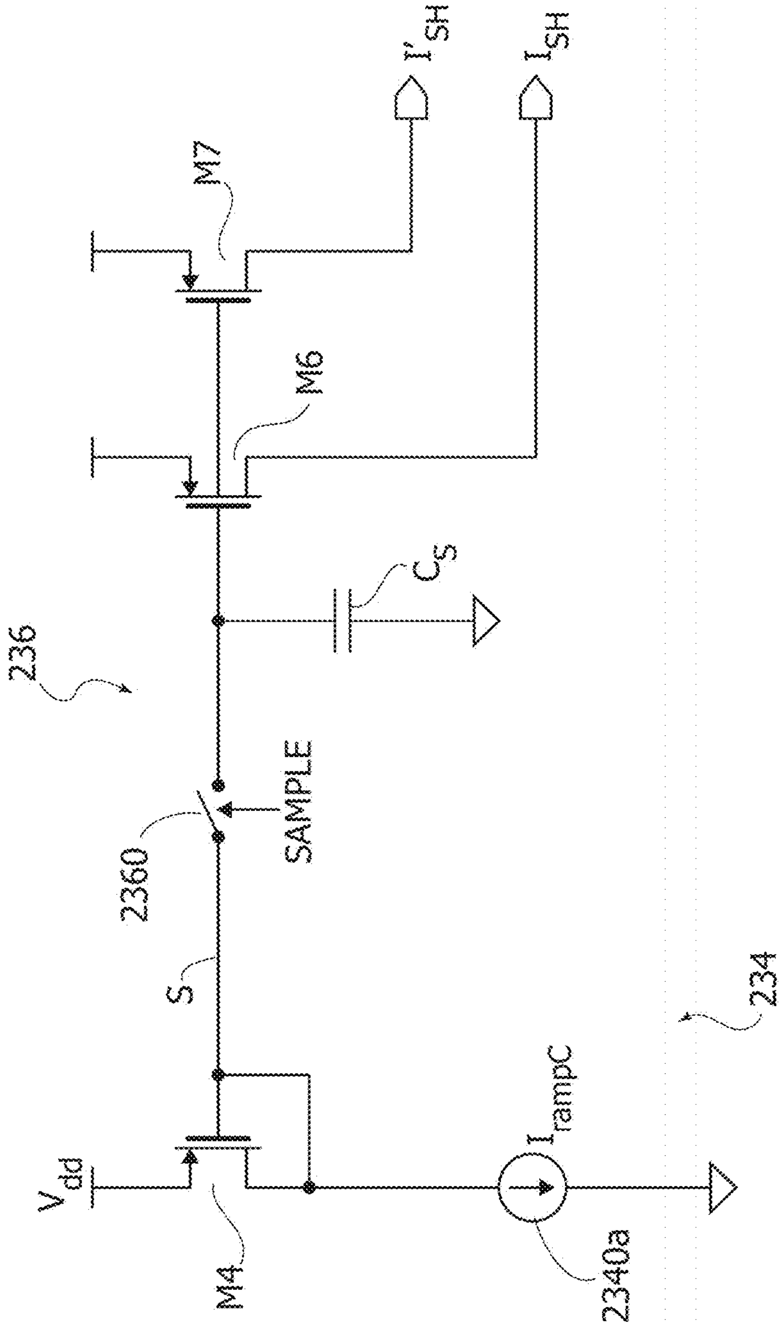
FIG. 14 shows a second embodiment of a sample-and-hold circuit for the measurement circuit of FIG. 12.

FIG. 14 shows a second embodiment of the circuit blocks 234, 2344 and 236. Specifically, in the embodiment considered, the slope compensation circuit 234 comprises, in addition to the ramp generator 2340, an additional ramp generator 2340*a* generating a copy $I_{rampC}$ of the current $I_{ramp}$. Accordingly, in this case, the FET M4 may again be configured as a current sensor (in particular a current-to-voltage conversion circuit) providing a signal S being indicative of the current $I_{rampC}-I_{ramp}$. For example, in FIG. 14, the FET M4 is a p-channel FET, wherein the source terminal is connected to a supply voltage, such as Vdd, the drain terminal is connected to the output of the current generator 2340*a* and the gate terminal is connected to the drain terminal. Accordingly, the sample-and-hold circuit 236 may have the same structure as the sample-and-hold circuit described with respect to FIG. 13.

Figure 15:
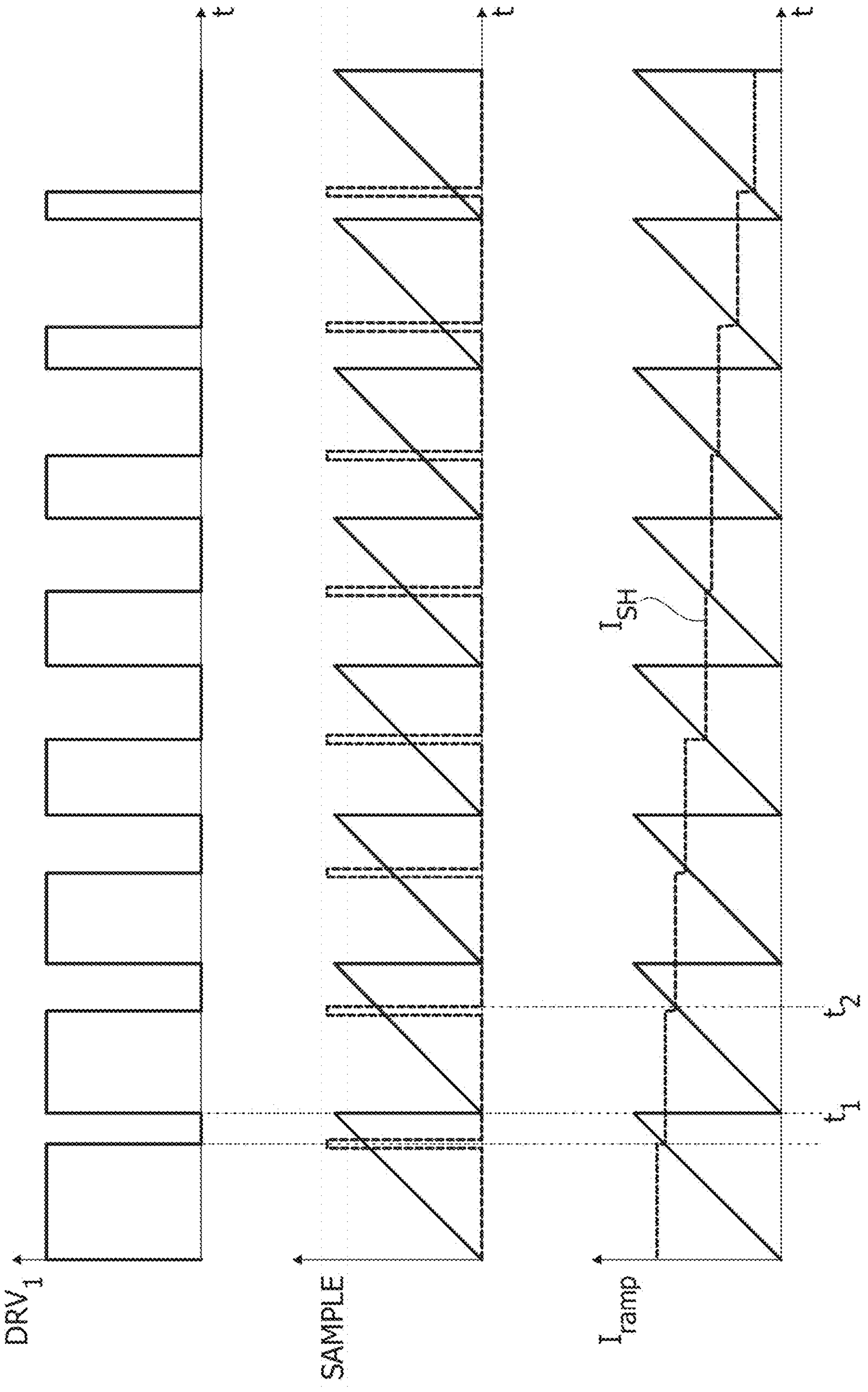
FIG. 15 shows exemplary waveforms of the operation of the sample-and-hold circuit of FIGS. 12, 13 and 14.

FIG. 15 shows an example of the operation of the sample-and-hold circuits 236 shown in FIGS. 12, 13 and 14. Specifically, as described in the foregoing, the half-bridge driver circuit asserts the signal $DRV_1$ at an instant $t_1$ and de-asserts the signal $DRV_1$ at an instant $t_2$. In this respect, the sample-and-hold circuit 236 is configured to generate the current $I_{SH}$ by storing the value of the signal $I_{ramp}$ at the instant $t_2$, e.g., in response to the signal SAMPLE comprising a pulse at the instant $t_2$.

For example, in various embodiments, the control circuit 22*a* comprises for this purpose a current-to-voltage conversion circuit, e.g., M4, configured to provide a voltage S indicative of the current $I_{slope}$ (e.g., via the signal $I_{slopeC}$), a capacitance $C_S$ configured to store the voltage S at the instant $t_2$, e.g., in response to the signal SAMPLE, and an additional voltage-to-current converter, e.g., M6, configured to provide the current $I_{SH}$, wherein the current-to-voltage conversion circuit and the voltage-to-current converter are dimensioned such that the value of the current $I_{SH}$ corresponds to the value of the current $I_{slope}$ at the instant $t_2$.

Figure 16:
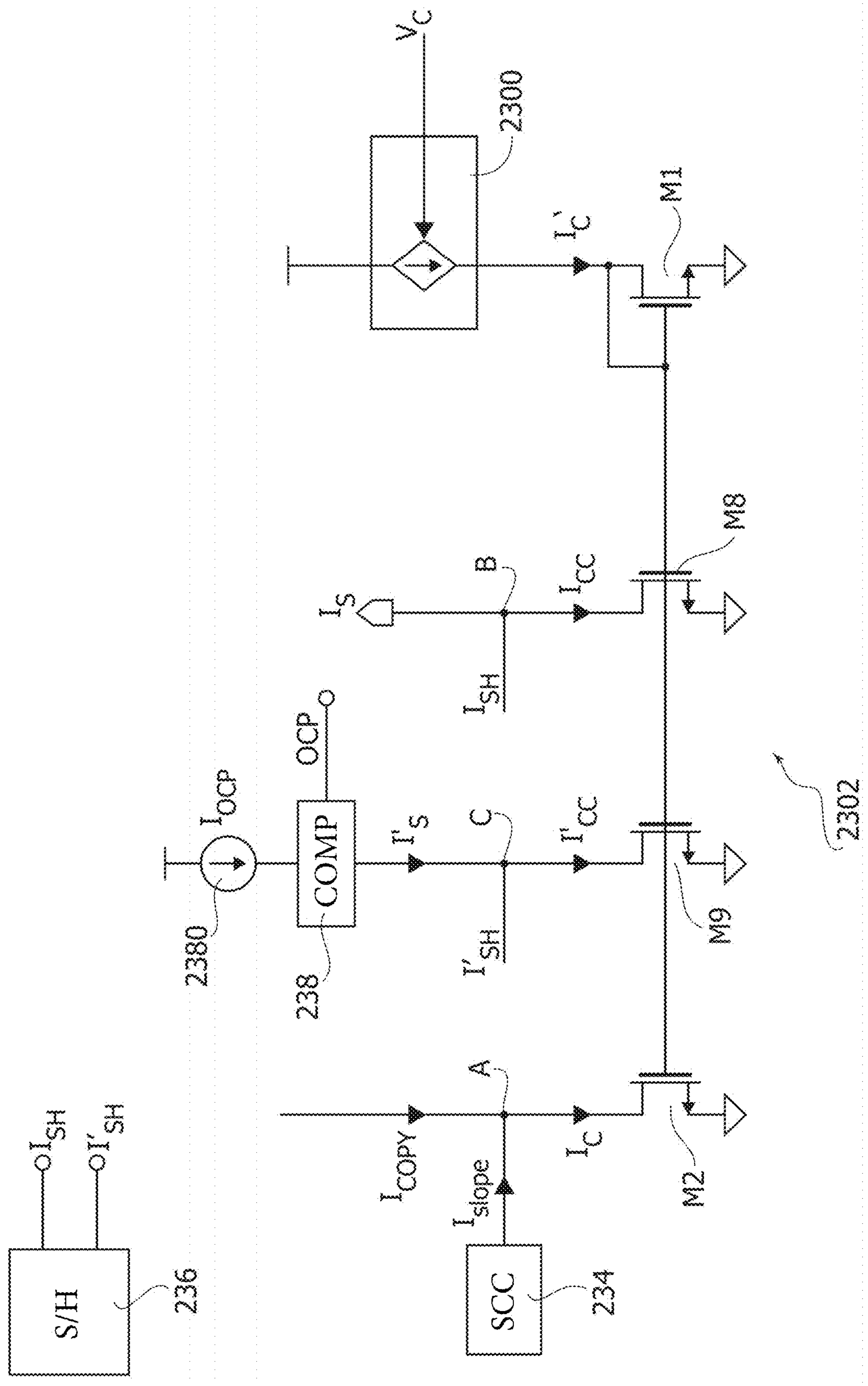
FIG. 16 shows an embodiment of the measurement circuit of FIG. 12.

FIG. 16 shows an embodiment of a circuit configured to generate a signal $I_S$ corresponding to an estimate of the peak current $I_{LPK}$. Specifically, as described in the foregoing, the sample-and-hold circuit 234 provides a current $I_{SH}$ corresponding to the current $I_{slope}(t_2)$. As described with respect, the current $I_{SH}$ should be subtracted from the current $I_{CC}$ corresponding to a copy of the current $I_C$.

For example, in various embodiments, the current source 230 comprises the current mirror 2302. In this case, the current $I_{CC}$ may be generated by providing a further output stage/FET M8 of the current mirror 2302, wherein the FET M8 has the same scaling M as the FET M2, whereby the FETs M2 and M8 are transversed by the same current. For example, in the embodiment considered, the FET M8 is a n-channel FET, where the source terminal is connected to ground, the gate terminal is connected to the gate terminal of the FET M1 (gate terminal of the FET M2), and the drain terminal provides the current $I_{CC}$. Accordingly, in the embodiment considered, the currents $I_{SH}$ and $I_{CC}$ may be provided to the node B, which provides a current $I_S=I_{CC}-I_{SH}$ (see also the description of equations 12 and 13).

As described in the foregoing, in various embodiments, the sample-and-hold circuit 236 may provide also one or more further currents $$I'_{SH}$$

having the same value as the current $I_{SH}$. For example, in the embodiment considered, the current mirror 2302 comprises a further output stage/FET M9, wherein the FET M9 has the same scaling M as the FET M2, whereby the FETs M2 and M9 are transversed by the same current. For example, in the embodiment considered, the FET M9 is a n-channel FET, where the source terminal is connected to ground, the gate terminal is connected to the gate terminal of the FET M1 (gate terminal of the FET M2), and the drain terminal provides a current $$I'_{SH}$$

Accordingly, in the embodiment considered, also the currents $$I'_{SH} \text{ and } I'_{CC}$$

may be provided to a node C, which provides a current $$I'_S = I'_{CC} - I'_{SH},$$

where $$I'_S = I_S.$$

For example, in this case, the current $I_{SH}$ may be used to determine the partitioning of the power stages Q1 and Q2, and the current $$I'_{SH}$$

may be used to verify whether the current $I_L$ exceeds a maximum threshold, thereby implementing an Overcurrent Protection (OCP). For example, in FIG. 16, the current $$I'_{SH}$$

is provided to a current comparator (COMP) 238 configured to compare the current $$I'_{SH}$$

with a current $I_{OCP}$ indicative of an overcurrent condition. For example, the current $I_{OCP}$ may be provided by a current source 2380. Accordingly, in various embodiments, the comparator 238 may assert a signal OCP when the current $$I'_{SH}$$

exceeds the current $I_{OCP}$.

Figure 17:
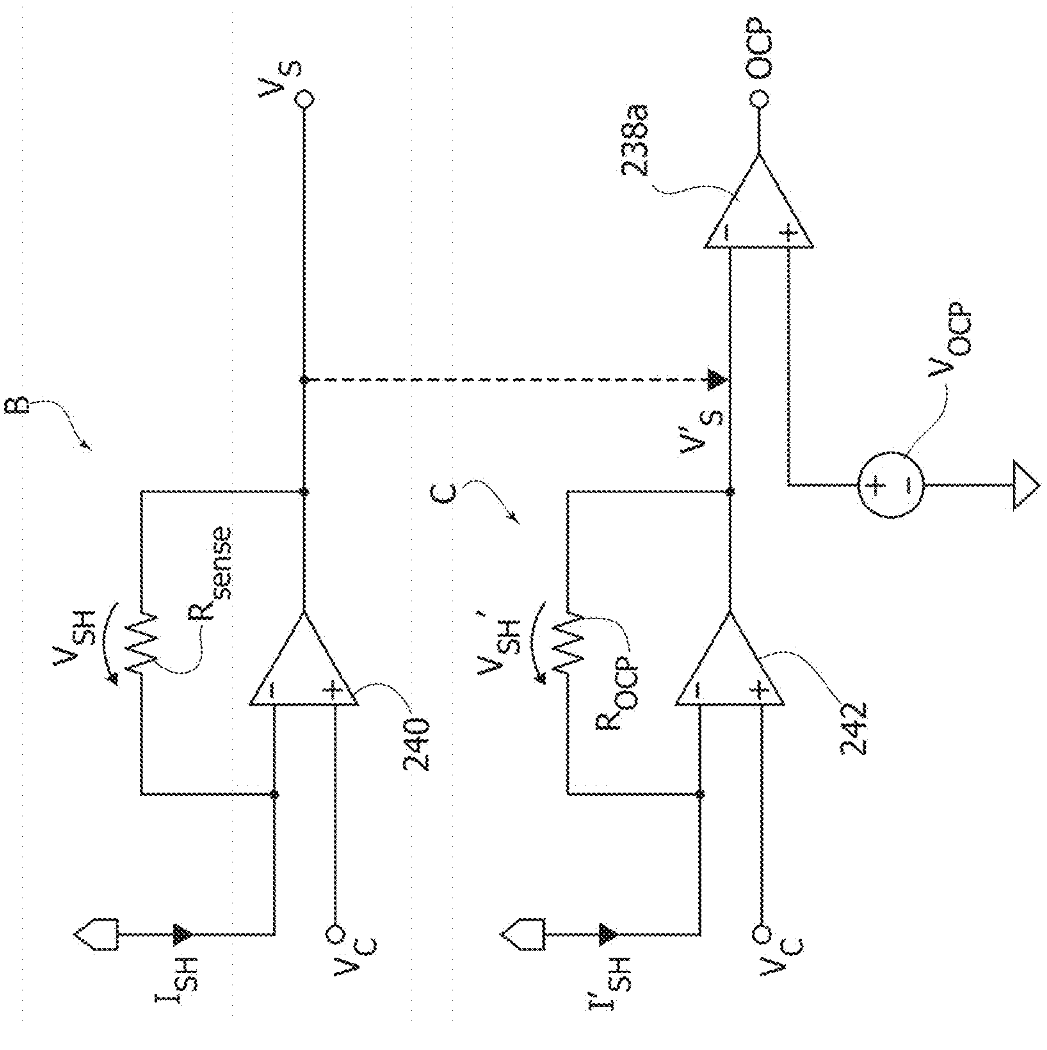
FIG. 17 shows a further embodiment of a measurement circuit.

FIG. 17 shows a further embodiment of a circuit configured to generate a signal corresponding to an estimate of the peak current $I_{LPK}$. Specifically, instead of generating a current $I_S$, the circuit is configured to generate a voltage $V_S$ being indicative (and preferably proportional to) the peak current $I_{LPK}$.

Also, in this case, the sample-and-hold circuit 234 provides a current $I_{SH}$ corresponding to the current $I_{slope}(t_2)$. As described with respect, the current $I_{SH}$ should be subtracted from the current $I_{CC}$ corresponding to a copy of the current $I_C$. In this respect, as shown in equation (2), the current $I_C$ is proportional to the voltage $V_C$. Accordingly, in the embodiment considered, the summation circuit B is implemented with a current-to-voltage conversion circuit configured to generate a voltage $V_{SH}$ proportional to the current $I_{SH}$, and a subtraction circuit configured to generate a signal $V_S$ corresponding to the difference between the voltage $V_C$ and the voltage $V_{SH}$.

For example, in FIG. 17, the summation circuit B is implemented with an operation amplifier 240 receiving at the inverting input the current $I_{SH}$ and the non-inverting input the voltage $V_C$, wherein the output of the operation amplifier is connected via a resistance $R_{sense}$ to the inverting input. Accordingly, in the embodiment considered, the output of the operation amplifier 240 provides a voltage $V_S$ corresponding to:

$$V_S = V_C - V_{SH} = V_C - I_{SH} \cdot R_{sense} \tag{14}$$

Accordingly, equation (14) may be rewritten according to equations (9) and (10) to:

$$V_S = (I_{LPK}/K + D \cdot I_{ramp,PK}) \cdot \frac{1}{g} - D \cdot I_{ramp,PK} \cdot R_{sense} \tag{15}$$

Specifically, in various embodiments, the resistance $R_{sense}$ is selected in order to compensate the gain g, i.e.:

$$R_{sense} = \frac{1}{g} \tag{16}$$

whereby the voltage $V_S$ is proportional to the peak value $I_{LPK}$, i.e.:

$$V_S = I_{LPK}/K \cdot g \tag{17}$$

Accordingly, in various embodiments, the summation circuit C may be implemented with a similar circuit. For example, in FIG. 17, the summation circuit C is implemented with an operation amplifier 242 receiving at the inverting input the current $$I'_{SH}$$

and the non-inverting input the voltage $V_C$, wherein the output of the operation amplifier is connected via a resistance $R_{OCP}$ to the inverting input. Accordingly, in various embodiments, also the resistance $R_{OCP}$ is selected in order to compensate the gain g, whereby the output of the operational amplifier 242 provides a voltage $$V_S'$$

proportional to the peak value $I_{LPK}$.

Accordingly, in this case, the voltage $$V_S'$$

and a threshold voltage $V_{OCP}$ may be provided to a voltage comparator 238*a* configured to assert the overcurrent signal OCP when the voltage $$V_S'$$

exceeds the voltage $V_{OCP}$. In various embodiments, instead of generating an additional voltage $$V_S',$$

the comparator 238*a* may also be configured to assert the overcurrent signal OCP when the voltage $V_S$ (generated by the summation circuit B) exceeds the voltage $V_{OCP}$.

Of course, without prejudice to the principle of the invention, the details of construction and the embodiments may vary widely with respect to what has been described and illustrated herein purely by way of example, without thereby departing from the scope of the present invention, as defined by the ensuing claims.

The claims are an integral part of the technical teaching of the disclosure provided herein.

The invention claimed is:

1. A half-bridge driver circuit for a half-bridge configured to supply an inductive load, said half-bridge driver circuit comprising:

a first terminal configured to provide a first drive signal to a gate terminal of a first Field-Effect Transistor (FET) representing a high-side electronic switch of said half-bridge;

a second terminal configured to provide a second drive signal to a gate terminal of a second FET representing a low-side electronic switch of said half-bridge;

a feedback terminal configured to receive a feedback signal indicative of a quantity to be regulated;

wherein said half-bridge driver circuit is configured to periodically repeat switching cycles by:

closing said first FET via said first drive signal at the beginning of each switching cycle; and detecting an instant when a current flowing through said first FET reaches a threshold value and, in response thereto, opening said first FET via said first drive signal and closing said second FET via said second drive signal;

wherein said half-bridge driver circuit comprises:

a variable current generator configured to generate a first current as a function of a control voltage;

an error amplifier configured to generate said control voltage by comparing said feedback signal with a reference signal, wherein said error amplifier comprises a regulator having a proportional and an integral component; and a slope compensation circuit configured to generate a second current, wherein said second current is a ramp signal being reset at the beginning of each switching cycle, and wherein said threshold value is generated by subtracting said second current from said first current;

wherein said half-bridge driver circuit is configured to:

sample said second current in response to detecting said instant; and generate a signal indicative of said threshold value by determining a difference between said sampled second current and said first current.

2. The half-bridge driver circuit according to claim 1, wherein said half-bridge driver circuit is configured to:

open said second FET via said second drive signal at the beginning of each switching cycle; or detect a further instant when a current flowing through said second FET reaches zero and, in response to detecting said further instant, opening said second FET via said second drive signal.

3. The half-bridge driver circuit according to claim 1 or claim 2, further comprising:

a reference FET configured to be transversed by a third current corresponding to the difference between said first current and said second current; and a comparator configured to generate a signal indicative of said instant by comparing the voltage drop at said reference FET with the voltage drop at said first FET.

4. The half-bridge driver circuit according to claim 1, wherein said sampling of said second current at said instant comprises:

obtaining a voltage indicative of said second current at said instant;

in response to detecting said instant, storing said obtained voltage to a capacitance; and generating a fourth current as a function of the obtained voltage at said capacitance.

5. The half-bridge driver circuit according to claim 4, wherein said slope compensation circuit comprises a current source configured to generate a ramp signal, and wherein said half-bridge driver circuit comprises:

a third FET configured to be transversed by said ramp signal, wherein a gate terminal of said third FET is connected to a drain terminal of said third FET, wherein said voltage indicative of said second current corresponds to a voltage at the gate terminal of said third FET; and a fourth FET configured to provide said fourth current, wherein a gate terminal of said fourth FET is driven via said obtained voltage at said capacitance.

6. The half-bridge driver circuit according to claim 1, wherein said variable current generator comprises:

a current source configured to generate a fifth current proportional to said control voltage; and a current mirror configured to generate said first current by mirroring said fifth current.

7. The half-bridge driver circuit according to claim 1, wherein said sampling of said second current at said instant comprises:

obtaining a voltage indicative of said second current at said instant;

in response to detecting said instant, storing said obtained voltage to a capacitance; and generating a fourth current as a function of the obtained voltage at said capacitance;

wherein said variable current generator comprises:

a current source configured to generate a fifth current proportional to said control voltage; and a current mirror configured to generate said first current by mirroring said fifth current;

wherein said current mirror is configured to generate a sixth current corresponding to said first current, and wherein said half-bridge driver circuit is configured to generate said signal indicative of said threshold value by subtracting said fourth current from said sixth current.

8. The half-bridge driver circuit according to claim 7, comprising:

an operation amplifier, wherein an inverting input of said operation amplifier is connected to said fourth current, a non-inverting input of said operation amplifier is connected to said control voltage and an output terminal of said operation amplifier is connected via a resistance to said inverting input of said operation amplifier, wherein a voltage at the output terminal of said operation amplifier corresponds to said signal indicative of said threshold value.

9. An integrated circuit, comprising: a half-bridge driver circuit according to claim 1.

10. A half-bridge circuit, comprising:

a first FET and a second FET connected in series between two input terminals configured to receive an input voltage, wherein an intermediate node between said first FET and said second FET represents a switching node configured to supply an inductive load; and a half-bridge driver circuit according to claim 1.

11. The half-bridge circuit according to claim 10, wherein said half-bridge circuit is an electronic converter providing a buck-converter, and wherein said feedback signal is indicative of an output voltage or output current generated by said electronic converter.

12. A method of operating a half-bridge circuit configured to supply an inductive load, the method comprising:

periodically repeat switching cycles by:

closing a first Field-Effect Transistor (FET) representing a high-side electronic switch of said half-bridge circuit at a beginning of each switching cycle;

detecting an instant when a current flowing through said first FET reaches a threshold value and, in response to detecting said instant, opening said first FET and closing a second FET representing a low-side electronic switch of said half-bridge circuit;

generating a first current as a function of a control voltage;

generating via a regulator having a proportional and an integral component said control voltage by comparing a feedback signal indicative of a quantity to be regulated with a reference signal;

generating a second current, wherein said second current is a ramp signal being reset at the beginning of each switching cycle, generating said threshold value by subtracting said second current from said first current;

wherein the method further comprises:

in response to detecting said instant, sampling said second current at said instant, and generating a signal indicative of said threshold value by subtracting said sampled second current from said first current.

* * * * *